United States Patent
Asveren

(10) Patent No.: US 10,129,163 B2
(45) Date of Patent: *Nov. 13, 2018

(54) METHODS AND APPARATUS FOR PREVENTING HEAD OF LINE BLOCKING FOR RTP OVER TCP

(71) Applicant: Sonus Networks, Inc., Westford, MA (US)

(72) Inventor: Tolga Asveren, Bordentown, NJ (US)

(73) Assignee: Sonus Networks, Inc., Westford, MA (US)

( * ) Notice: Subject to any disclaimer, the term of this patent is extended or adjusted under 35 U.S.C. 154(b) by 113 days.

This patent is subject to a terminal disclaimer.

(21) Appl. No.: 15/262,850

(22) Filed: Sep. 12, 2016

(65) Prior Publication Data
US 2016/0380901 A1  Dec. 29, 2016

Related U.S. Application Data

(63) Continuation of application No. 14/265,007, filed on Apr. 29, 2014, now Pat. No. 9,461,931.

(60) Provisional application No. 61/947,244, filed on Mar. 3, 2014.

(51) Int. Cl.
    *H04L 12/801* (2013.01)
    *H04L 12/863* (2013.01)
    *H04L 12/815* (2013.01)

(52) U.S. Cl.
    CPC ............ *H04L 47/34* (2013.01); *H04L 47/193* (2013.01); *H04L 47/22* (2013.01); *H04L 47/6205* (2013.01)

(58) Field of Classification Search
    CPC ...... H04L 47/6205; H04L 47/22; H04L 47/34
    See application file for complete search history.

(56) References Cited

U.S. PATENT DOCUMENTS

| 7,257,840 | B2 * | 8/2007 | Ramaiah | G06F 21/552 370/235 |
|---|---|---|---|---|
| 8,194,675 | B2 * | 6/2012 | Tavares | H04L 1/1628 370/389 |
| 2006/0209807 | A1 * | 9/2006 | Lor | H04L 12/5601 370/352 |
| 2008/0259926 | A1 * | 10/2008 | Tavares | H04L 1/1628 370/394 |
| 2010/0014530 | A1 * | 1/2010 | Cutaia | H04L 12/66 370/401 |

(Continued)

*Primary Examiner* — Omer S Mian
(74) *Attorney, Agent, or Firm* — Straub & Straub; Stephen T. Straub; Michael P. Straub

(57) ABSTRACT

Methods and apparatus for processing and using TCP packets to communicate RTP packets are described. Head of line blocking is avoided by operating a TCP packet processing module to output RTP packet data to an application irrespective of whether or not a preceding TCP packet was received. Since output of packet data to an application using RTP packets is not delayed when there is a missing TCP packet, head of line blocking is avoided. RTP packet data is subjected to pattern matching in order to identify and process RTP packets in the case where RTP header information such as packet length information is missing due to the failure to receive a TCP packet. The methods are particularly well suited for the communication of audio and/or video by devices operating behind firewalls which block UDP or other types of packets other than TCP packets.

20 Claims, 18 Drawing Sheets

(56) References Cited

U.S. PATENT DOCUMENTS

2012/0317461 A1* 12/2012 Hwang ............. H03M 13/2906
  714/776
2014/0334502 A1* 11/2014 Gammon ................ H04L 69/08
  370/466
2018/0097720 A1* 4/2018 Jaffer .................... H04L 45/021

* cited by examiner

METHODS AND APPARATUS FOR PREVENTING HEAD OF LINE BLOCKING FOR RTP OVER TCP

RELATED APPLICATIONS

The present application claims the benefit of U.S. patent application Ser. No. 14/265,007 filed on Apr. 29, 2014 which claims the benefit of U.S. Provisional Patent Application Ser. No. 61/947,244 filed Mar. 3, 2014 both of which are hereby expressly incorporated by reference in their entirety.

BACKGROUND

Real-Time Transport Protocol (RTP) is often used for real time communications including voice traffic. RTP is normally communicated using User Datagram Protocol (UDP) which is a best effort type of protocol which does not involve packet retransmission in the case of a lost or missing packet.

Transmission Control Protocol (TCP) in contrast to UDP includes retransmission mechanisms where a lost or missing packet may be requested and other TCP packets held until the missing packet is received. This can lead to what is sometimes referred to as Head Of Line Blocking (HOLB) where a single missing TCP packet may delay the delivery of subsequently received TCP packets.

HOLB can degrade real time communications where it may result in voice or other information being delayed potential past a point in time where it may be used. While a small number of packets may end up being retransmitted in TCP due to the loss of a packet, the effect of HOLB can affect a much larger number of packets since multiple packets may be delayed while a missing packet is retransmitted. Thus, while TCP provides for ordered delivery of packets, it suffers from head of line blocking (HOLB). If segment x is not delivered, any subsequent segment is normally not sent to the application until segment x is received and delivered.

While the HOLB problem makes TCP less desirable than other protocols for RTP packet communications, in some situations such as at hotels or other public places, UDP and other types of non-TCP packets are blocked for security and/or other reasons by firewalls or NAT (Network Address Translation) devices. For this reason, TCP is now being used in some cases to communicate RTP packets.

RTP over TCP is sometimes used to traverse firewalls, which do not allow UDP traffic or require presence of Hypertext Transfer Protocol (HTTP) proxy. This is commonly the case at hotels and other locations where UDP traffic may be blocked.

RTP over TCP packets are carried based on RFC4571. The RFC4571 specification provides a 16-bit length field at the front of the RTP packet. The length field can be used to identify packet boundaries in an RTP stream when it is present.

When UDP is used to communicate RTP packets, RTP packets are normally not split across UDP packet boundaries. However, in the case of TCP which is deemed more reliably than UDP since it has a packet retransmission mechanism, RTP packets may be split across multiple TCP packets. Thus, loss of a TCP packet may result in loss or unavailability of the length field of an RTP packet making it difficult to identify complete RTP packets in the case of one or more missing TCP packets.

RTP is used to carry real time communication data. Delay of such information is not desired due to its real time nature. This is in conflict with HOLB. What makes HOLB especially bad for RTP applications is that it may prevent even packets, which arrived in a timely manner, to be delivered to the application.

In view of the above discussion it should be appreciated that there is a need for methods and apparatus which allow TCP to communicate RTP packets while avoiding the problems associated with head of line blocking which normally occur when TCP is used for communications purposes.

SUMMARY

Methods and apparatus for processing and using TCP packets to communicate RTP packets are described. After receiving data obtained from the start of the TCP packet stream sufficient to allow identification of an RTP packet, e.g., the first RTP packet communicated in the TCP packet stream, head of line blocking is avoided by operating a TCP packet processing module to output RTP packet data to an application irrespective of whether or not a preceding TCP packet was received. Since output of packet data to an application using RTP packets is not delayed during receipt of an ongoing TCP stream until a missing TCP packet is received, head of line blocking is avoided. RTP packet data is subjected to pattern matching in order to identify and process RTP packets in the case where RTP header information such as packet length information corresponding to a packet is missing due to the failure to receive a TCP packet in a sequence of TCP packets used to communicate RTP data. One or both devices operating as communications peers in an RTP session may implement the methods and/or apparatus described herein. The methods are particularly well suited for use by devices operating behind firewalls which block UDP or other types of packets other than TCP packets. The methods and apparatus are also suited for devices located behind a Network Address Translation (NAT) device as well as by other devices, e.g., devices in the core network of on the core network side of a network border. In some cases the methods and apparatus are used by a session border controller (SBC).

While head of line blocking is avoided for applications involved in RTP communications, in some embodiments the device implementing the method uses conventional processing for handling TCP packet streams communicating data other than RTP packets, e.g., Hyper Text Markup Language (HTML) data or documents.

In at least some embodiments a device includes multiple TCP interface modules. An application selects between a TCP interface module which implements head of line blocking when the application does not use RTP packets and selects the TCP interface module implemented in accordance with the invention for processing to TCP packet streams including RTP packets.

An exemplary method of communicating packets using TCP, in accordance with some embodiments, includes: receiving a TCP packet which is part of a TCP packet sequence; extracting data from said TCP packet; and providing said extracted data and a corresponding TCP packet sequence number to an RTP application irrespective of whether or not a preceding TCP packet in said packet sequence has been received. An exemplary apparatus for communicating packets using TCP, in accordance with some embodiments, includes: an interface including a receiver configured to receive a TCP packet which is part of a TCP packet sequence; a data extraction module configured to extract data from said TCP packet; and a communications module configured to provide said extracted data and a corresponding TCP packet sequence number to an RTP application irrespective of whether or not a preceding TCP packet in said packet sequence has been received.

While various embodiments have been discussed in the summary above, it should be appreciated that not necessarily all embodiments include the same features and some of the features described above are not necessary but can be desirable in some embodiments. Numerous additional features, embodiments, and benefits of various embodiments are discussed in the detailed description which follows.

BRIEF DESCRIPTION OF THE FIGURES

FIG. 14 illustrates the combination of FIGS. 14A and 14B.

DETAILED DESCRIPTION

Methods and apparatus for using TCP packets to communicate RTP packets are described. The methods and apparatus of the present invention avoid or reduce many of the problems associated with TCP head of line blocking by allowing content of a received TCP packet, corresponding to RTP packet stream, to be passed to an application, after successful receipt of an initial portion of a TCP packet stream, e.g., sufficient information to identify an RTP packet, e.g., the first RTP packet communicated by the TCP stream, irrespective of whether or not a preceding TCP packet was successfully received or is still waiting to be received. Thus, once information is received to allow for the reliable detection of RTP packets through header information and/or pattern matching, RTP packet data obtained from TCP packets is passed to an application without waiting for receipt of TCP packets which may have been delayed or lost during transmission.

Figure 1:
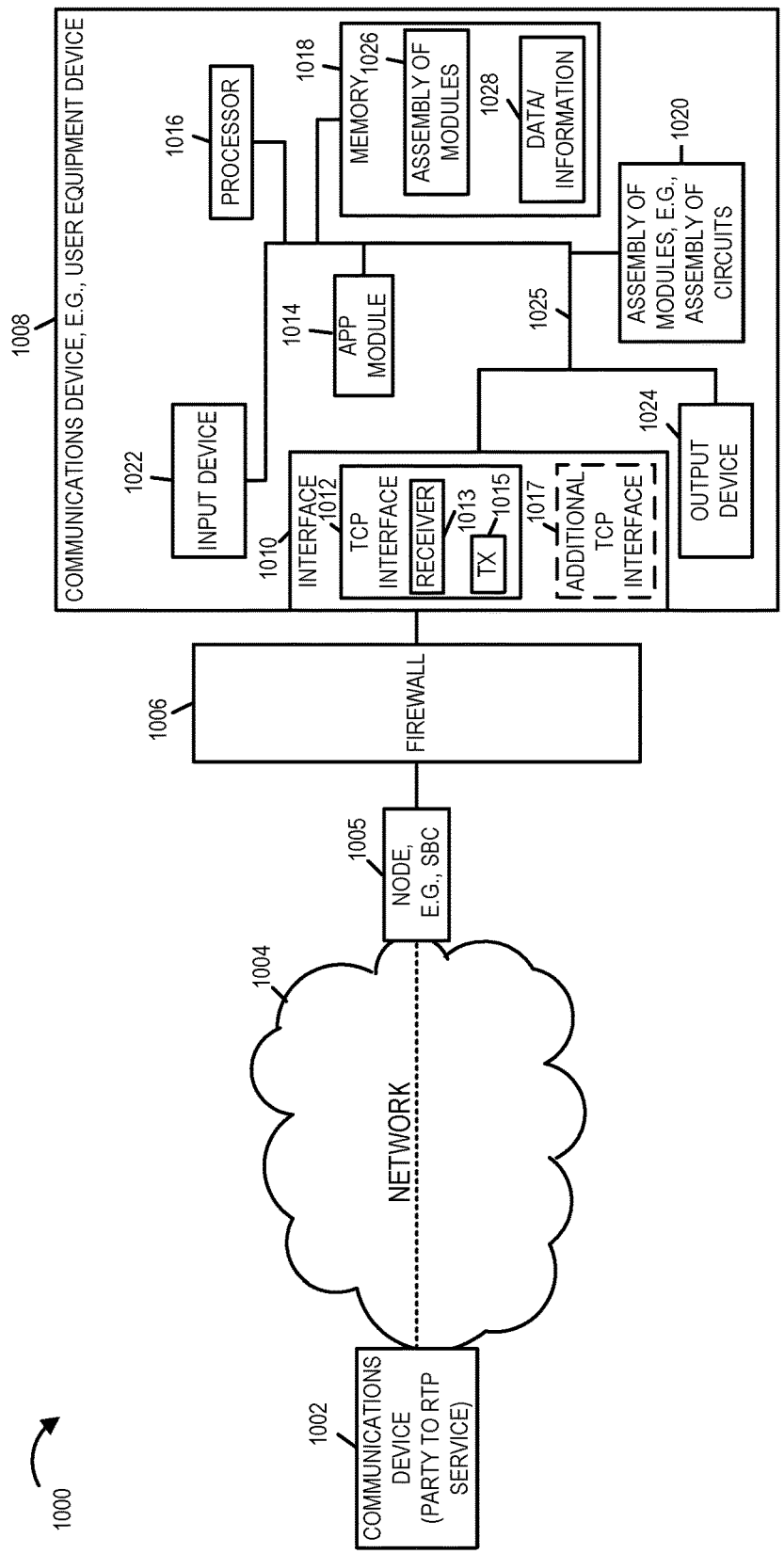
FIG. 1 is a drawing of an exemplary system in which TCP packets may be communicated, e.g., TCP packets used to communicate RTP packets, in accordance with an exemplary embodiment.

FIG. 1 is a drawing of an exemplary system 1000 including a communications device 1002, a network 1004, a node 1005, e.g., a session border controller (SBC), a firewall 1006, and a communications device 1008, in accordance with an exemplary embodiment. Communication device 1002 is coupled to a communications network 1004. Communications device 1002, e.g., a user equipment device, is a party to RTP service. Node 1005, e.g., a session border controller (SBC), couples the network 1004 to a firewall 1006. Communications device 1008, e.g., a user equipment device, communicates through firewall 1006. Communications device 1008 includes an interface 1010, an application module 1014, a processor 1016, e.g., a CPU, memory 1018, an assembly of modules 1020, e.g., an assembly of circuits, an input device 1022, e.g., keyboard, keypad, microphone, switches, and/or touch screen, etc., an output device 1024, e.g. display, speaker, etc. The various elements (1010, 1014, 1016, 1018, 1020, 1022, 1024) are coupled together via a bus 1025 over which the various elements may interchange data and information. Interface 1010 includes a TCP interface 1012. TCP interface 1012 includes a receiver 1013 and a transmitter 1015. Receiver 1013 is configured to receive a TCP packet which is part of a TCP packet sequence. Receiver 1013 is further configured to receive a second TCP packet which is part of said TCP packet sequence. Transmitter module 1015 is configured to transmit an acknowledgment indicating successful receipt of a TCP packet, said transmission of the acknowledgement being under the control of an acknowledgment communication control module.

In some embodiments, interface 1010 includes one or more additional TCP interfaces, e.g., additional TCP interface 1017. In some such embodiments, an application selects between additional TCP interface 1017 which implements head of line blocking when the application does not use RTP packets and selects the TCP interface module 1012 implemented in accordance with the invention for processing to TCP packet streams including RTP packets.

Memory 1018 includes assembly of modules 1026 and data/information 1028. Data/information 1028 includes a sequence of stored packet data. Data/information 1028 includes received TCP packets, data extracted from received TCP packets and corresponding TCP packet sequence numbers. Data/information 1028 further includes information identifying gaps. Data/information 1028 further includes pattern matching information, information indicating an identified start of an RTP packet, information indicating a determined end of an RTP packet, information identifying a length field, and a determined length field value, length field value reasonableness limits, and recovered RTP packets. Pattern matching information includes information identifying which fields in an RTP header are used for pattern matching, information identifying which bits in which identified fields are used for pattern matching and which bits are don't care condition bits. Pattern matching information further includes a current pattern to be used for pattern matching, which may be updated in response to a successful find of a start of an RTP packet. Pattern matching information further includes a pattern corresponding a last RTP packet whose start was not determined based on pattern matching.

An exemplary method in accordance with the present invention can be implemented by an assembly of modules included in a communication device, e.g., communications device 1008. The modules in the assembly of modules used to implement the present invention can, and in some embodiments are, implemented fully in hardware within the processor 1016, e.g., as individual circuits. The modules in the assembly of modules can, and in some embodiments are, implemented fully in hardware within the assembly of modules 1020, e.g., as individual circuits corresponding to the different modules. In other embodiments some of the modules are implemented, e.g., as circuits, within the processor 1016 with other modules being implemented, e.g., as circuits within assembly of modules 1020, external to and coupled to the processor 1016. As should be appreciated the level of integration of modules on the processor and/or with some modules being external to the processor may be one of design choice.

Alternatively, rather than being implemented as circuits, all or some of the modules in assembly of modules may be implemented in software and stored in the memory 1018 of the communications device 1008, with the modules controlling operation of communications device to implement the functions corresponding to the modules when the modules are executed by a processor, e.g., processor 1016. In some such embodiments, the assembly of modules is included in the memory 1018 as assembly of modules 1026. In still other embodiments, various modules in assembly of modules are implemented as a combination of hardware and software, e.g., with another circuit external to the processor providing input to the processor 1016 which then under software control operates to perform a portion of a module's function. While shown in the communications device 1008 embodiment as a single processor, e.g., computer, it should be appreciated that the processor 1016 may be implemented as one or more processors, e.g., computers.

When implemented in software the modules include code, which when executed by the processor 1016, configure the processor 1016 to implement the function corresponding to the module. In embodiments where the assembly of modules is stored in the memory 1018, the memory 1018 is a computer program product comprising a computer readable medium comprising code, e.g., individual code for each module, for causing at least one computer, e.g., processor 1016, to implement the functions to which the modules correspond.

Completely hardware based or completely software based modules may be used. However, it should be appreciated that any combination of software and hardware, e.g., circuit implemented modules may be used to implement the functions. As should be appreciated, the modules control and/or configure the communications device 1008 or elements therein such as the processor 1016, to perform functions of corresponding steps of an exemplary method in accordance with the present invention. Thus the assembly of modules includes various modules that perform functions of the corresponding steps of an exemplary method in accordance with the present invention.

Various aspects described herein prevent or avoid at least some of the negative effects of HOLB for traffic destined toward an entity, e.g., end device which is party to an RTP communications session, which handles TCP packets in the manner described herein. The methods and apparatus described herein can be used by a packet receiving device, e.g., communications peer in an RTP communications session, without requiring any special behavior by the communications peer in the RTP communications session. While both devices in a communications session need not implement the HOLB avoidance mechanisms described herein, they may do so with both devices then benefiting by avoiding or reducing the problems of HOLB associated with used of TCP packets for communication. Thus in FIG. 1, in some embodiments, both communications device 1008 and communications device 1002 implement methods in accordance with the present invention.

Various embodiments include one or both of the following two parts: (i) changes in TCP stack behavior, as compared to a conventional TCP stack that implements HOLB, so that it can deliver segments in an non-orderly way depending on application preferences; and (ii) implementation of methods to determine the boundaries between RTP packets in the case where receipt of RTP packet length information may not occur for at least some packets, e.g., packets which may be partially received due to one or more missing TCP packets.

Exemplary TCP stack changes include a change in the orderly delivery behavior of TCP stack, as compared to a conventional TCP stack behavior. In some embodiments, in accordance with a feature of the present invention, all received segments are delivered to the application together with sequence number.

Figure 2:
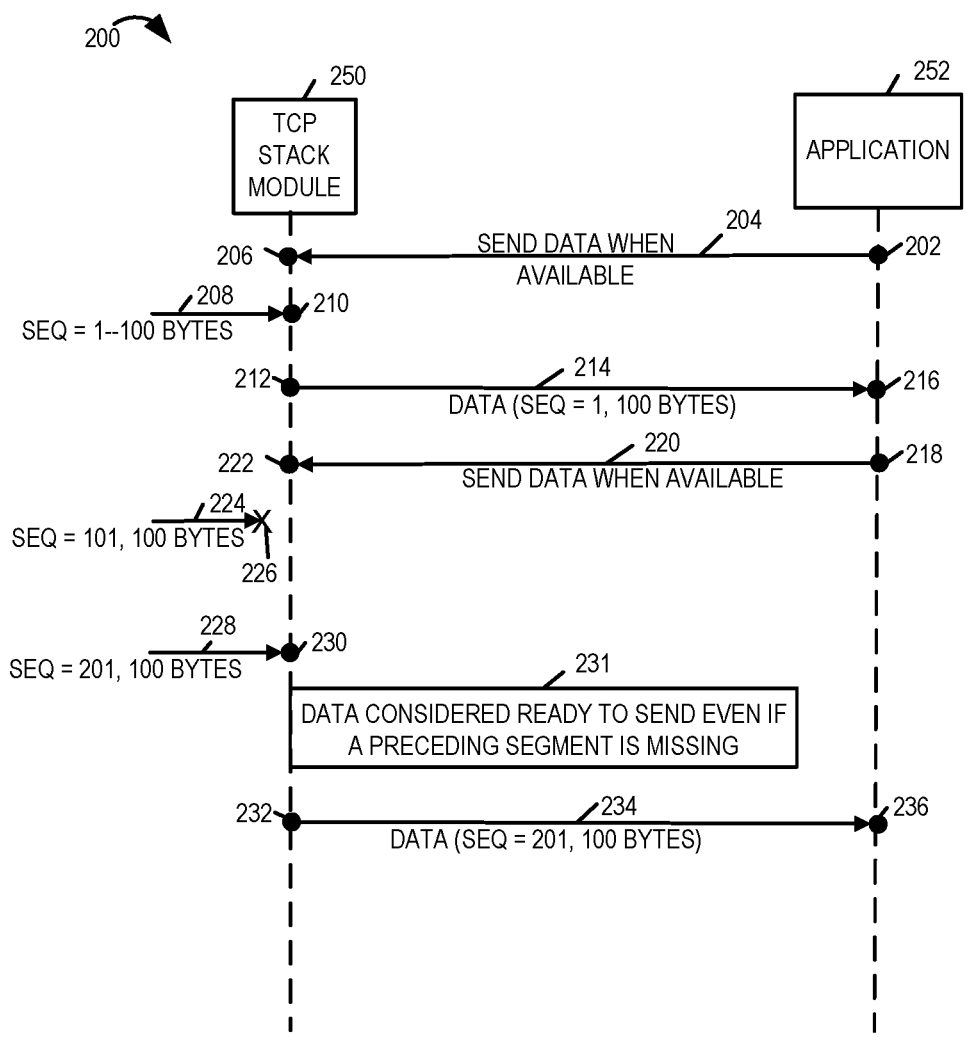
FIG. 2 includes illustrates a first example of TCP stack behavior in accordance with an exemplary embodiment of the present invention.

FIG. 2 illustrates a first example of TCP stack behavior in accordance with an exemplary embodiment of the present invention. Drawing 200 of FIG. 2 illustrates exemplary steps and exemplary signaling with regard to TCP stack module 250, e.g., an assembly of protocol processing elements, and application 252, for a case in which a segment of data is missing at the TCP stack module 250. In one exemplary embodiment, TCP stack module 250 and application 252 are included in communications device 1008 of system 1000 of FIG. 1. In step 202, application 252 generates and sends signal 204 to TCP stack module 250 requesting that the TCP stack module 250 send data when available. In step 206 TCP stack module 250 receives signal 204. Signal 208 communicating a first segment of data with sequence number=1 and including 100 bytes of data is received by TCP stack module 250 in step 210. In step 212, TCP stack module 250 generates and transmits signal 214 communicating the received first segment of data with sequence number=1 and including 100 bytes of data. In step 216, application 252 receives signal 214 and recovers the communicated first segment of data. In step 218, application 252 generates and sends signal 220 to TCP stack module 250 requesting that the TCP stack module 250 send data when available. In step 222 TCP stack module 250 receives signal 220. Signal 224 communicating a second segment of data with sequence number=101 and including 100 bytes of data does not reach TCP stack module 250, as indicated by X 226, e.g., the second segment of data is lost in transmission to the TCP stack module 250. Signal 228 communicating a third segment of data with sequence number=201 and including 100 bytes of data is received by TCP stack module 250 in step 230. In accordance with a feature of the current invention, the data is considered ready to send even if a preceding segment is missing, as indicated by block 231, e.g., the second segment is missing, but the third segment is available. In step 232, TCP stack module 250 generates and transmits signal 234 communicating the received third segment of data with sequence number=201 and including 100 bytes of data. In step 236, application 252 receives signal 234 and recovers the communicated third segment of data.

Figure 3:
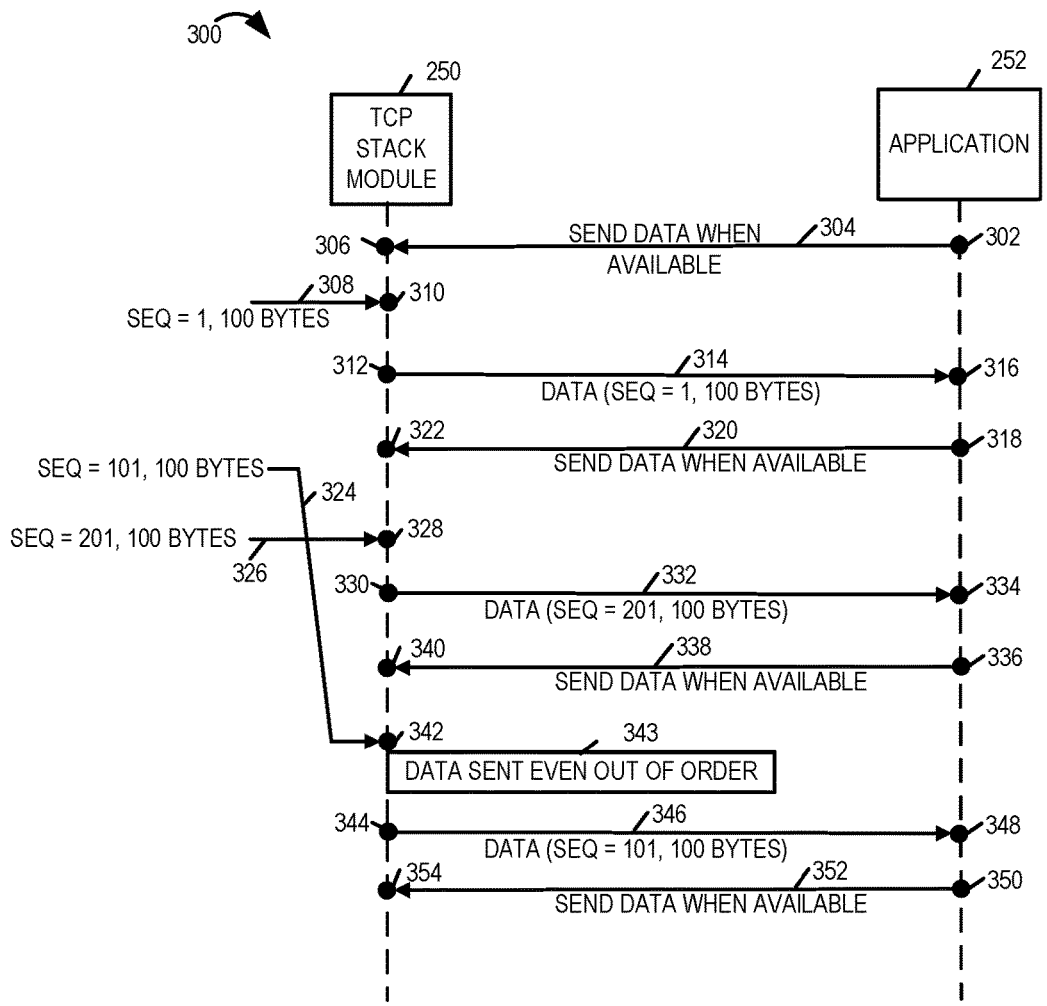
FIG. 3 illustrates a second example of TCP stack behavior in accordance with an exemplary embodiment of the present invention.

FIG. 3 illustrates a second example of TCP stack behavior in accordance with an exemplary embodiment of the present invention. Drawing 300 of FIG. 3 illustrates exemplary steps and exemplary signaling with regard to TCP stack module 250 and application 252 for a case in which a segment of data arrives out of order at the TCP stack module 252. In step 302, application 252 generates and sends signal 304 to TCP stack module 250 requesting that the TCP stack module 250 send data when available. In step 306 TCP stack module 250 receives signal 304. Signal 308 communicating a first segment of data with sequence number=1 and including 100 bytes of data is received by TCP stack module 250 in step 310. In step 312, TCP stack module 250 generates and transmits signal 314 communicating the received first segment of data with sequence number=1 and including 100 bytes of data. In step 316, application 252 receives signal 314 and recovers the communicated first segment of data. In step 318, application 252 generates and sends signal 320 to TCP stack module 250 requesting that the TCP stack module 250 send data when available. In step 322 TCP stack module 250 receives signal 320. Signal 324 communicating a second segment of data with sequence number=101 and including 100 bytes of data is transmitted toward the TCP stack module 250. Signal 326 communicating a third segment of data with sequence number=201 and including 100 bytes of data is received by TCP stack module 250 in step 328. In step 330, TCP stack module 250 generates and transmits signal 332 communicating the received third segment of data with sequence number=201 and including 100 bytes of data. In step 334, application 252 receives signal 332 and recovers the communicated third segment of data. In step 336, application 252 generates and sends signal 338 to TCP stack module 250 requesting that the TCP stack module 250 send data when available. In step 340 TCP stack module 250 receives signal 338. Signal 324 communicating the second segment of data with sequence number=101 and including 100 bytes of data is received by TCP stack module 250 in step 342. In accordance with a feature of the present invention, the data with be sent even out of order, as indicated by block 343, e.g., segment 2 will be sent to application 252 after segment 3. In step 344, TCP stack module 250 generates and transmits signal 346 communicating the received second segment of data with sequence number=101 and including 100 bytes of data. In step 348, application 252 receives signal 346 and recovers the communicated second segment of data. In step 350, application 252 generates and sends signal 352 to TCP stack module 250 requesting that the TCP stack module 250 send data when available. In step 354 TCP stack module 250 receives signal 354.

If even some previous segments are missing, acknowledgement indication is constructed according to the last received segment if that segment is incrementing the sequence number. This essentially prevents any retransmissions on the sender, which would be triggered due to the receipt of an acknowledgement with an older sequence number.

Figure 4:
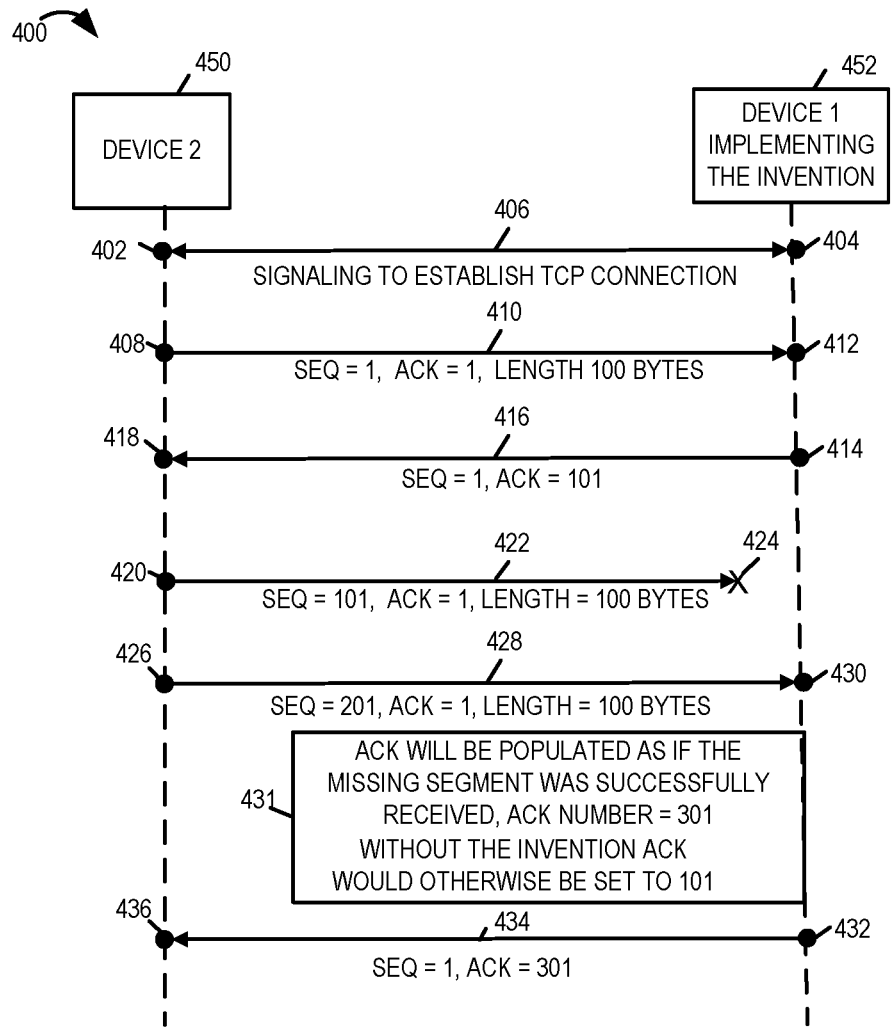
FIG. 4 illustrates an example including acknowledgment signaling in accordance with an exemplary embodiment.

FIG. 4 illustrates an example including acknowledgment signaling in accordance with an exemplary embodiment. In drawing 400 of FIG. 4 exemplary signaling is shown between device 1 452, which is implementing the present invention, and device 2 450. Device 1 452 is, e.g., communications device 1008 of FIG. 1. Device 1 452 includes a TCP stack module, e.g., TCP stack module 250 of FIG. 2 and FIG. 3.

In step 402 and step 404, device 2 450 and device 1 452 communicate, via signaling 406, to establish a TCP connection. In step 408 device 2 450 generates and sends a signal 410 including a sequence number=1, an acknowledgement control bit set to 1, length information indicating 100 bytes of data are being communicated, and 100 bytes of data. Thus in step 410 device 2 450 sends, e.g., transmits, a first data segment to device 1 452. In step 412 device 1 452 receives signal 410 and recovers the information being communicated. In step 414, device 1 452 generates and sends an acknowledgment signal 416 including sequence number=1 and acknowledgment number=101. In step 418, device 2 418 receives the acknowledgment signal 416 and recovers the communicated information. In step 420 device 2 450 generates and sends a signal 422 including a sequence number=101, an acknowledgement control bit set to 1, length information indicating 100 bytes of data are being communicated, and 100 bytes of data. In this example, signal 422 in not successfully received by device 1 452, as indicated by X 424. Thus, the second data segment is not successfully communicated from device 2 450 to device 1 452. In step 426 device 2 450 generates and sends a signal 428 including a sequence number=201, an acknowledgement control bit set to 1, length information indicating 100 bytes of data are being communicated, and 100 bytes of data. In step 430 device 1 452 receives signal 428 and recovers the information communicated. Thus, the third data segment is not successfully communicated from device 2 450 to device 1 452. In accordance with a feature of the present invention, the acknowledgment will be populated as if the missing segment, e.g., the second data segment, was received, e.g., the acknowledgment number will be set to 301, rather than 101, as indicated by block 431. In step 432, device 1 452 generates and sends an acknowledgment signal 434 including sequence number=1 and acknowledgment number=301. In step 436, device 2 450 receives the acknowledgment signal 343.

There still could be retransmissions if sender does not receive an ACK in time. TCP connection establishment/tear down mechanisms are kept intact.

In various embodiments, in accordance with the present invention, there are novel Application changes. The Application reads as many bytes as available (or less depending on implementation) from the socket corresponding to the TCP connection.

The application maintains an ordered list of segments based on the sequence numbers/length information. This list may have gaps as TCP stack sends segments as received without ordering/waiting for gaps to be filled. It should be noted that data segments do not necessarily align with RTP message boundaries. A single segment may include: a single whole packet, some portion of packet, portions of multiple packets or some complete packets and portions of others. The list is treated merely as a data stream with gaps.

Figure 5:
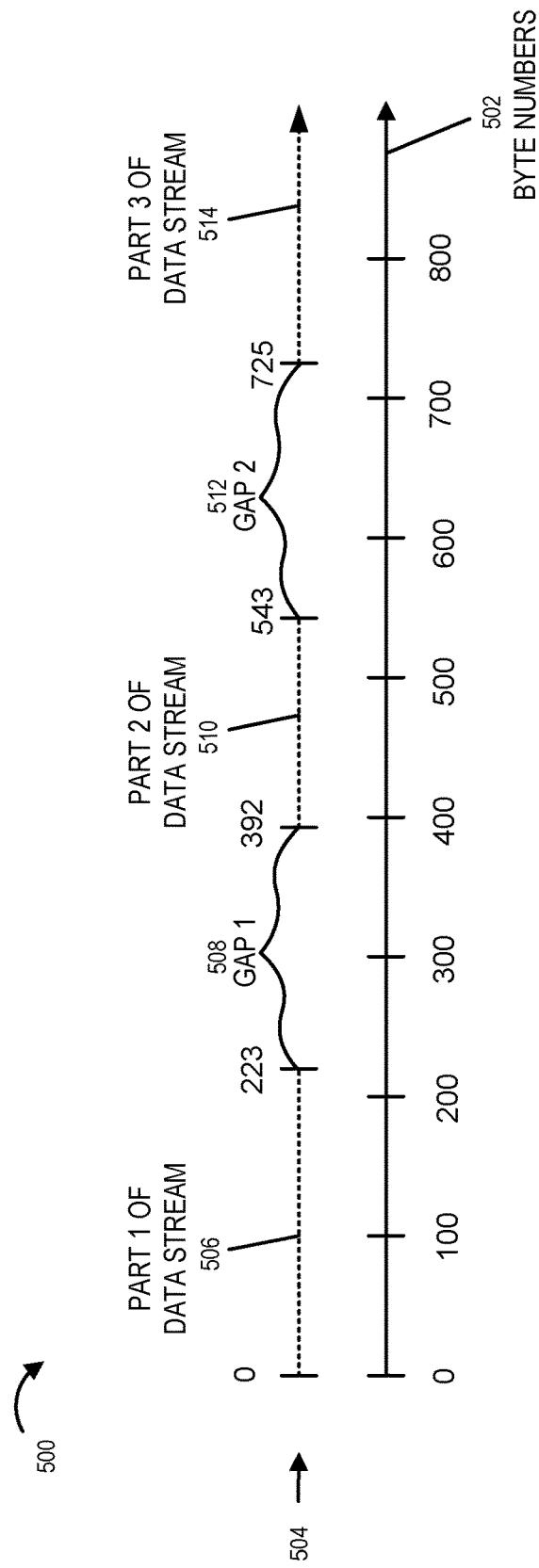
FIG. 5 illustrates an exemplary data stream with gaps.

Drawing 500 of FIG. 5 includes an exemplary data stream with gaps 504. Horizontal line 502 represents byte numbers. The exemplary data steam with gaps 504 includes a first data steam portion 506 corresponding to bytes 0 to 233, followed by a first gap 508, followed by a second data stream portion 510 corresponding to bytes 392 to 543, followed by a second gap 512, and followed by a third data stream portion 514 corresponding to byte 725 and increasing in byte number.

Application starts processing the Data Stream. There is no need to do anything special as long as a gap is not encountered except storing the Synchronization Source Identifier (SSRC Identifier) of the first packet and updating last received Sequence Number/Timestamp with each packet and false pattern match related procedures as indicated in the following sections.

Figure 6:
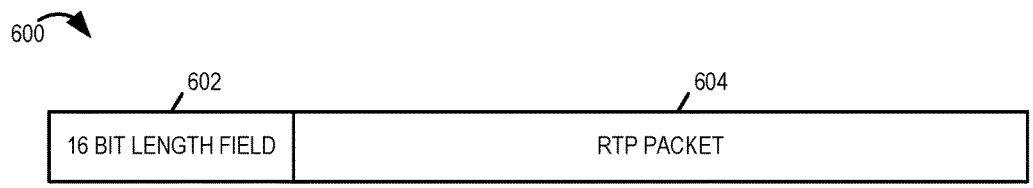
FIG. 6 is a drawing illustrating a framing format for RTP packets transmitted over TCP.

FIG. 6 is a drawing 600 illustrating a framing format for RTP packets transmitted over TCP. RTP packets transmitted over TCP follow the following format according to RFC4571. There is a 16 bit length field portion 602 followed by an RTP or RTCP packet portion 604.

In accordance with a feature of the present invention, packet boundaries are found based on the 16-bit Length Field. Special logic, in accordance with the present invention, and described in the following sections, is activated, e.g., kicks in, once a gap is encountered. Normal operation resumes once ordered segments are observed. Optionally, a timer can be, and in some embodiments is, started when a gap is encountered and data stream processing suspends until the gap is filled or the timer expires, whichever happens first.

Figure 7:
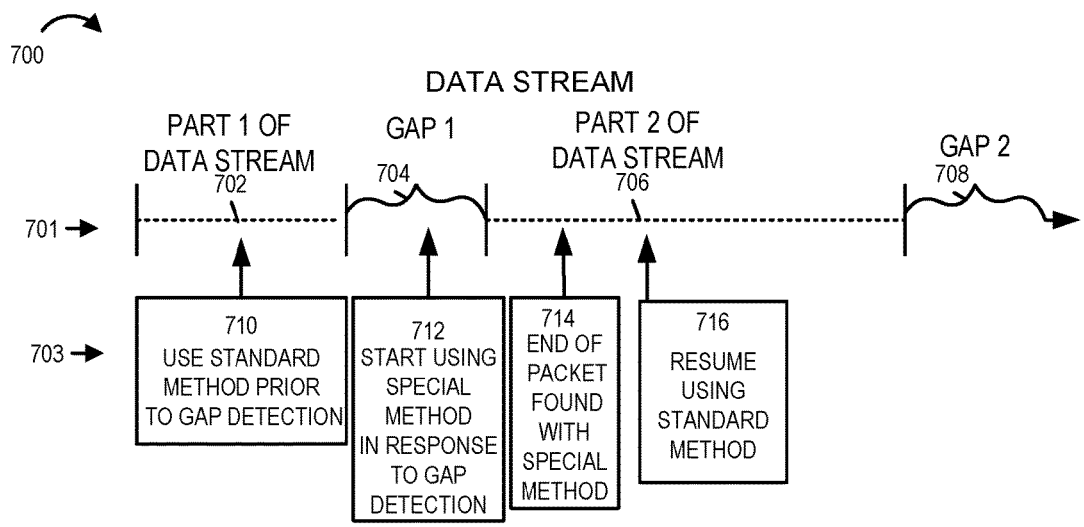
FIG. 7 is a drawing illustrating an exemplary data stream including gaps, and corresponding operations which occur over time.

FIG. 7 is a drawing 700 illustrating an exemplary data stream including gaps 702, and corresponding operations which occur over time 703. Exemplary data stream including gaps 701 includes part 1 of the data stream 702, which is followed by gap 1 704, which is followed by part 2 of the data stream 706, which is followed by part 2 of the data stream 706, which is followed by gap 2 708. During part 1 702, the standard method is used, as indicated by block 710. Once gap 1 704 is encountered, the special method is activated and used, as indicated by block 712. An end of packet is found using the special method, as indicated by block 714. The standard method resumes once ordered segments are observed, as indicated by block 716.

It is important that the application can identify the first RTP packet successfully, as content of this packet can be, and in various embodiment is, used to construct the pattern for an immediate gap. In various embodiments, the first RTP packet is identified using one or both of the two different ways described below. In various embodiments, only one of the two different approaches is implemented.

In the first approach, the TCP stack informs the application about the initial sequence number when TCP connection establishment is complete. Once the initial sequence number is known, the application can determine whether the initial data segment(s) is missing and if so can wait for it before starting packet construction on the rest of the stream.

In the second approach, the TCP stack treats the initial bytes specially and delivers them in order. It waits until the first 14 bytes (Length Field+RTP header parts relevant for pattern matching) are received before delivering any data to the application.

The application determines the RTP message boundaries by applying a fixed pattern on the received byte stream. The following fields: version field, payload type field, sequence number field, timestamp field, and SSRC field, with fixed positions are used for this purpose, and any field/any combination of fields can be optionally not used.

The version field is fixed as 2.

The payload type field conveys the payload type to use for a particular codec and is declared during session negotiation. In various embodiments, this field can be used for pattern matching only if the node, where this method is running, advertises a single codec during session negotiation. The other end can use any of the codecs if more than one codec are advertised and hence this field can't be used in a reliable way for such scenarios. In such a scenario, the bits of this field are "don't care" with regard to the pattern matching.

The sequence number field conveys a sequence number which identifies a particular message in a RTP stream and is incremented by 1 for each subsequent message. In various embodiments, the most significant 8 bits of the next expected sequence number are used during pattern matching. The reason for that is some packets may get lost and that could cause a no-match if all of the bits of the sequence number field are used for pattern matching. Not using the least significant 8-bits compensates for 256 lost packets. If desired, the number of bits can be adjusted to compensate for more/less packets. Thus in some embodiments, a different number of most significant bits of the sequence number field are used for pattern matching, e.g., the 9 most significant bit of the sequence number field are used for pattern matching to compensate for 132 lost packets.

The sequence value to use would be first learned based on the first RTP packet and will be updated based on the last received packet.

For example, consider that the Sequence Number of the last received RTP packet=54123=b(1101001101101011). The value to use during next pattern matching, assuming that the implementation uses the most significant 8 bits for pattern matching=11010011xxxxxxxx.

The timestamp field conveys the Timestamp which provides information about the sampling instant of the first octet of media data in RTP packet. In some embodiments, the most significant 16 bits of the timestamp field are used for pattern matching. The reason for that is some packets may get lost and that could cause a no-match if all the bits of the timestamp field are used. In some embodiments, the number of bits of the timestamp field to be used for pattern matching can be, and in some embodiments, is adjusted.

The Timestamp value to use would be first learned based on the first RTP packet and will be updated based on the last received packet. For example, consider that the Timestamp of the last received RTP packet=45896784=b (00000010101111000101010001010000). The value to use during next pattern matching (assuming that most significant 16 bits of the timestamp field are used for pattern matching)=0000001010111100xxxxxxxxxxxxxxxx.

The SSRC field conveys a 32 bit. SSRC value, which is a 32-bit integer identifying participants in a session and is chosen randomly by participants. The SSRC value is learned based on the first RTP packet. IN some embodiments the SSRC value is used for pattern matching. In some embodiments, there are some scenarios, where the SSRC may change during the session. In such a scenario, the SSRC field should be used for pattern matching only if it is known a priori or can be determined dynamically that SSRC change during the session is not a possibility.

In one example, in which the SSRC field is used for pattern matching, the SSRC of the first received RTP packet=5874123=b(1011001101000111001011) The value to use during pattern matching=1011001101000111001011

Figure 8:
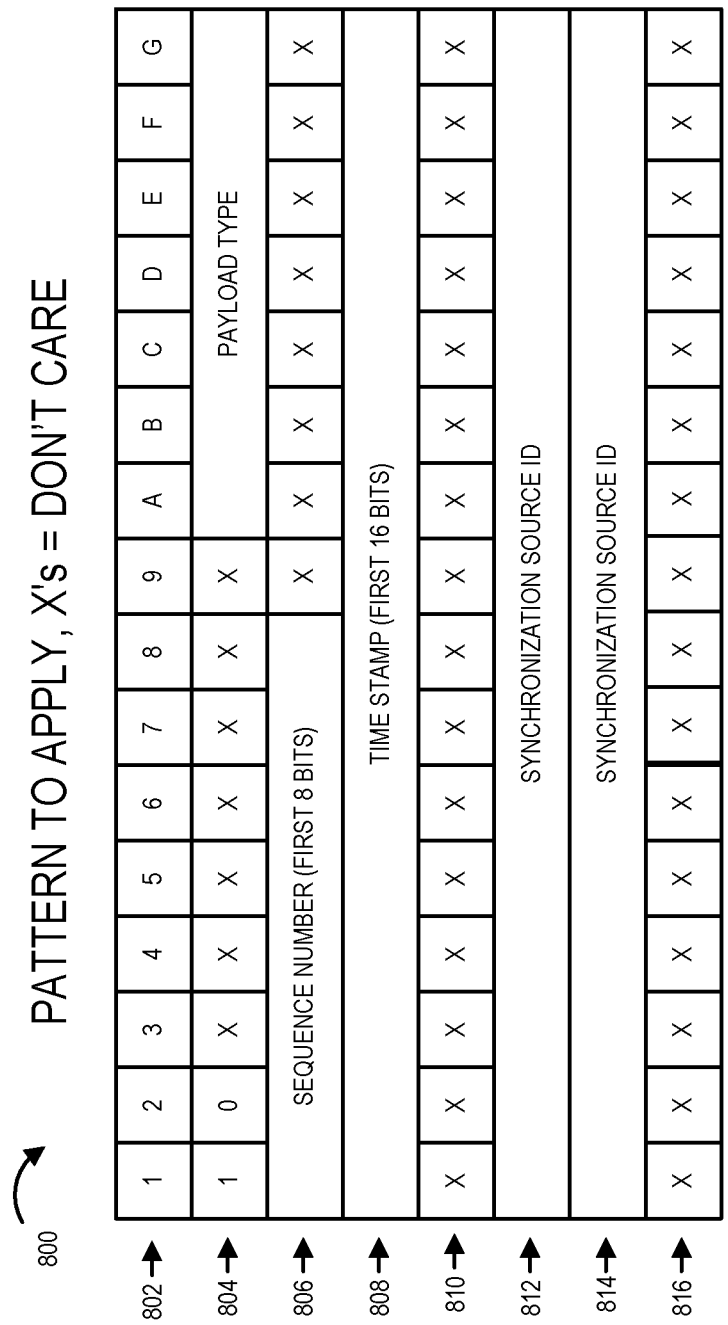
FIG. 8 illustrates an exemplary pattern to apply for matching, where X's represent don't care conditions.

Drawing 800 of FIG. 8 illustrates an exemplary pattern to apply for matching, where X's represent don't care condition. First row 802 identifies 16 ordered bit positions, which correspond to the subsequent rows. Note that first row 802 is not part of the message matching pattern but indicates bit numbering and/or positioning in the message to facilitate understanding of the locations of particular portions of the message pattern which is shown. Second row 804 includes a matching pattern for the version field with version field value=01, and a matching pattern for a payload type field which is the payload type value. Third row 806 includes a matching pattern using the first 8 bits of the sequence number field value. Fourth row 808 includes a matching pattern using the first 16 bits of the time stamp field value. The fifth row 810, corresponding to the least significant bits of the time stamp field, corresponds to don't cares with regard to the pattern matching. The sixth and seventh rows (812, 814) convey the 32 bit synchronization source ID value which is used for pattern matching. The bits of the eighth row 816 are don't care with regard to the pattern matching.

Once the pattern matches, the first matching byte is considered the beginning of the next RTP packet. Data before the match, prior to the length field, is considered as belonging to the previous packet.

Once the pattern match is complete and the Length field is identified, the Length field value will be used to determine the end of the message if enough ordered bytes are available.

Figure 9:
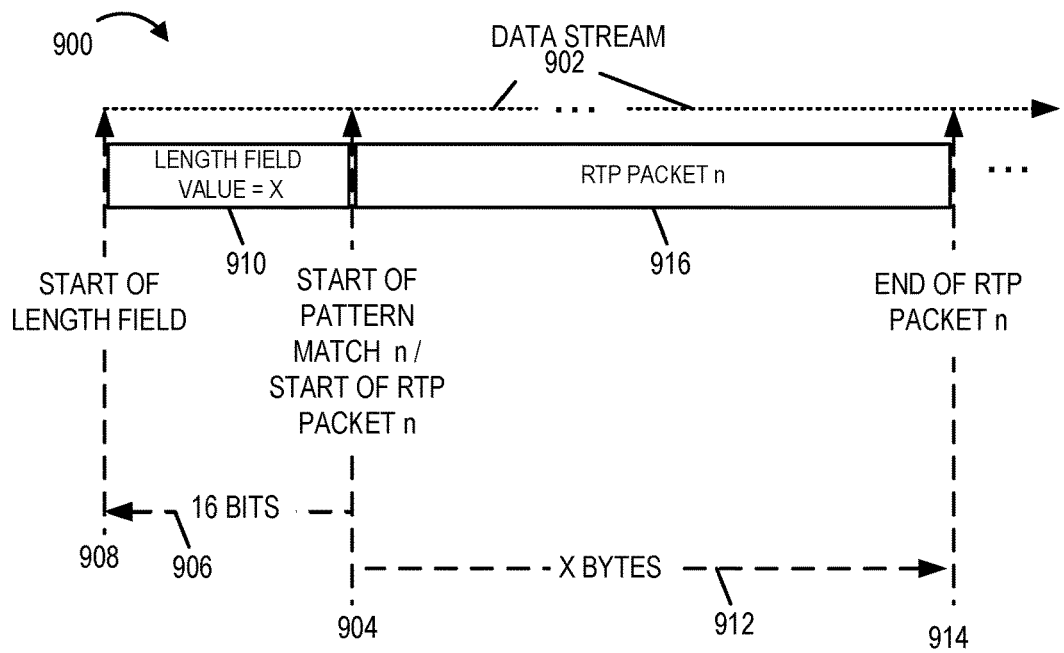
FIG. 9 illustrates an exemplary data stream in which there are enough available ordered bytes to determine the end of RTP packet n.

Drawing 900 of FIG. 9 illustrates an exemplary data stream 902 in which there are enough available ordered bytes to determine the end of RTP packet n. Point 904, in the data stream 902, indicates the exemplary identified start of a pattern match n, corresponding the start of RTP packet n. By proceeding back 16 bits, as indicated by arrow 906, the start of the length field 908, is identified. In this example, the 16 bit length field conveys a value=X, as indicated by box 910. Thus, proceed X bytes from the start of the pattern match 904, as indicated by arrow 912, to find the end 914 of RTP packet n 916 in the data stream 902.

If there are not enough ordered bytes to reach to the end of the packet, packet construction suspends, and packet construction resumes once more bytes are available at the relevant gap. While the packet construction is suspended, the method continues to run on the data stream after the gap and tries to find the next pattern match. Similarly, a gap may be encountered when going back on the Data Stream to find the start of the Length Field/packet. This also causes a suspension of packet construction. Optionally, the missing bytes in an RTP payload can be, and in some embodiments are, populated with a preconfigured value, e.g. "0", for certain codecs, e.g. G.711.

Figure 10:
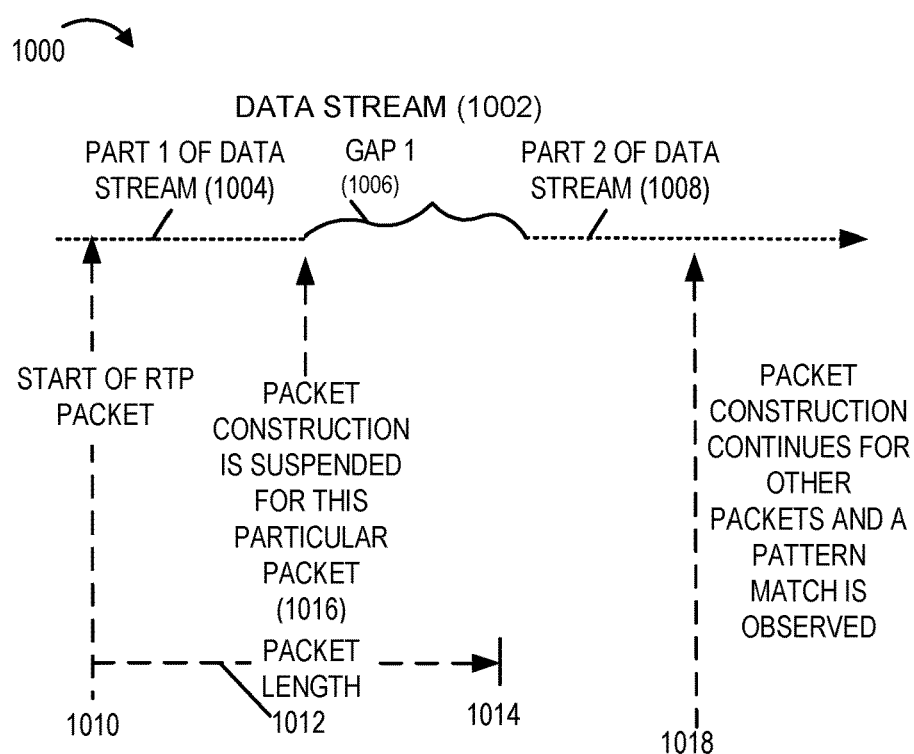
FIG. 10 illustrates an exemplary data stream in which there are not enough available ordered bytes to determine the end of RTP packet.

Drawing 1000 of FIG. 10 illustrates an exemplary data stream 1002 in which there are not enough available ordered bytes to determine the end of RTP packet. Exemplary data stream 1002 includes a first portion 1004 of the data stream, followed by a gap 1006, followed by a second portion 1008 of the data stream. The start of the exemplary RTP packet in the data stream is identified, as location 1010. Based on the length field value 1012, the end of the RTP packet is expected at location 1014 in the data stream 1002. However, because of gap 1006, packet construction of this particular packet is suspended at point 1016. The method continues to run on the data stream 1002 after the gap 1006. A pattern match is observed at point 1018 and packet construction continues for other packets.

In various embodiments, the ordering of segments is performed by an application based on RTP sequence numbers. The application can, and in some embodiments does, determine whether or not a late arriving packet should still be processed or not. The application can also, and in some embodiments does, decide how long to hold on received packets, if lost packets are detected, before starting to process the received packets which followed the lost packet or packets. For example, consider that Packet 1, Packet 3, Packet 4 are received, and packet 2 is a lost packet. Packet 1 is processed. The application decides how long to wait for Packet 2 before starting to process Packet 3 and Packet 4. Optionally, in some embodiment, all constructed packets are processed regardless of the timing of construction. This approach of processing all constructed packets regardless of the timing of construction is well suited for systems, where the packet processing is limited to relaying the packets to another entity.

Figure 11:
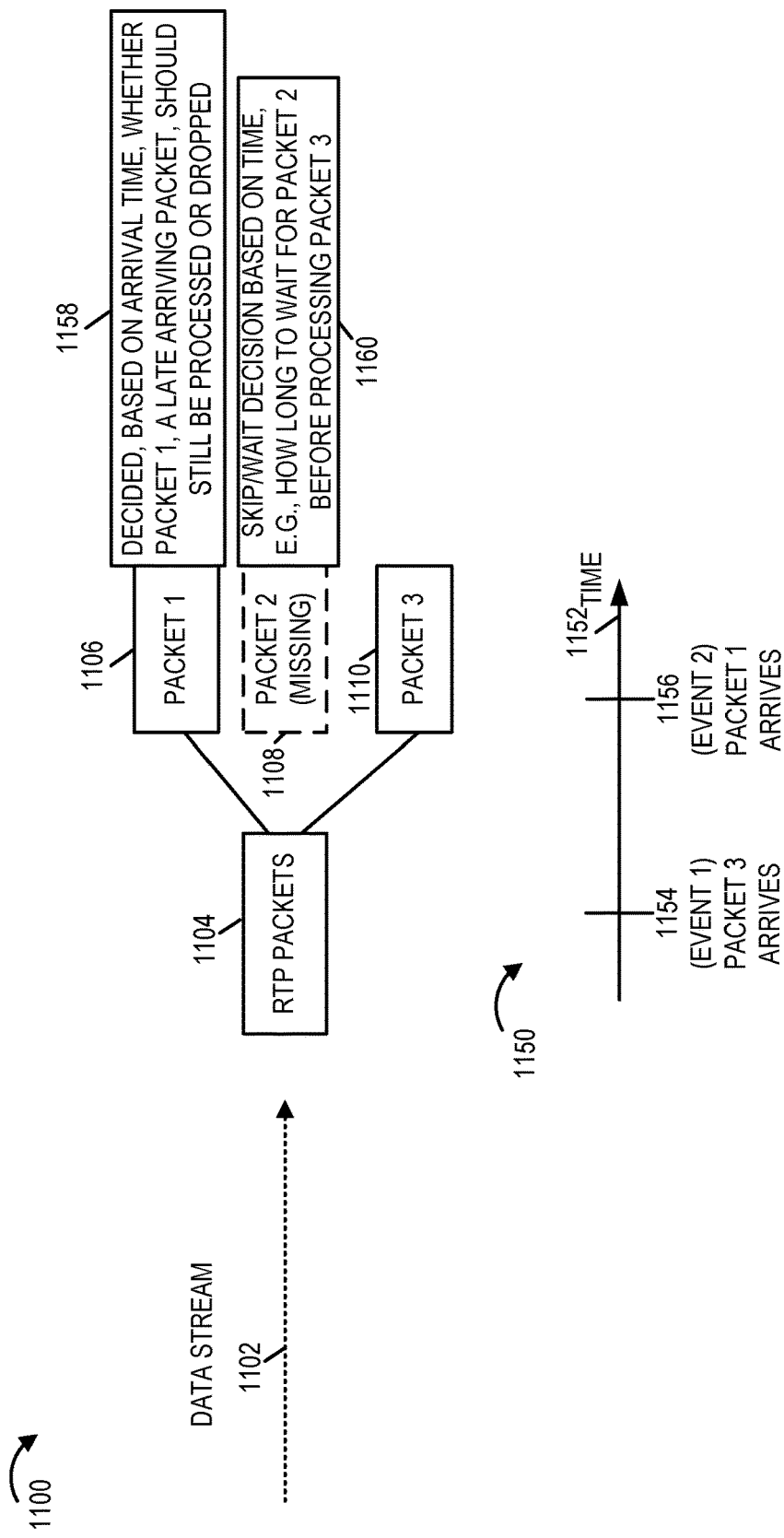
FIG. 11 illustrates an exemplary data stream which conveys RTP packets which may be received out of order.

Drawing 1100 of FIG. 11 illustrates an exemplary data stream 1102. Data stream 1102 conveys RTP packets 1104, which may be received out of order. Drawing 1150 illustrates an exemplary time line 1152 including event 1 1154, at which packet 3 1110 is received, and event 2 1156, at which packet 1 1106 is received. It is decided, based on the arrival time 1156, whether packet 1 1106, a late arriving packet should still be processed or should be dropped, as indicated by box 1158. Packet 2 1108 is a missing packet. A skip/wait decision is made based on time, as indicated by box 1160, e.g., a decision is made in regard to how long to wait for packet 2 1108 to arrive before deciding to process packet 3 1110, which follows packet 2 in the RTP packet ordering.

All the used fields are in RTP header and are not encrypted when SRTP is used, hence the mechanism works also for SRTP streams. Thus in various embodiments, the exemplary method including pattern matching can be, and in some embodiments, is used for SRTP packets in addition to RTP packets.

At least theoretically, there is a chance that there is a false indication of a packet detection based on a pattern match. To minimize the impact of such cases, in some embodiments, the Length Field is compared against an upper and lower limit, e.g., reasonableness checks are performed. In some embodiments, these upper/lower limits are configurable. In some embodiments, the upper limit is set to a value slightly more than the maximum expected RTP packet length, and the lower limit is set to a value slightly less than the minimum expected RTP packet length. If the Length Field value is outside of the range, a pattern match should be considered as invalid with regard to actually detecting the start of an RTP packet, and pattern matching operation re-starts after the starting byte of the current match. Optionally, in some embodiments, checking the value of the Length Field against a preconfigured range is performed for all packets including the ones constructed with the standard method. Again optionally, in some embodiments, pattern match is applied to all packets as well as a sanity check.

Figure 12:
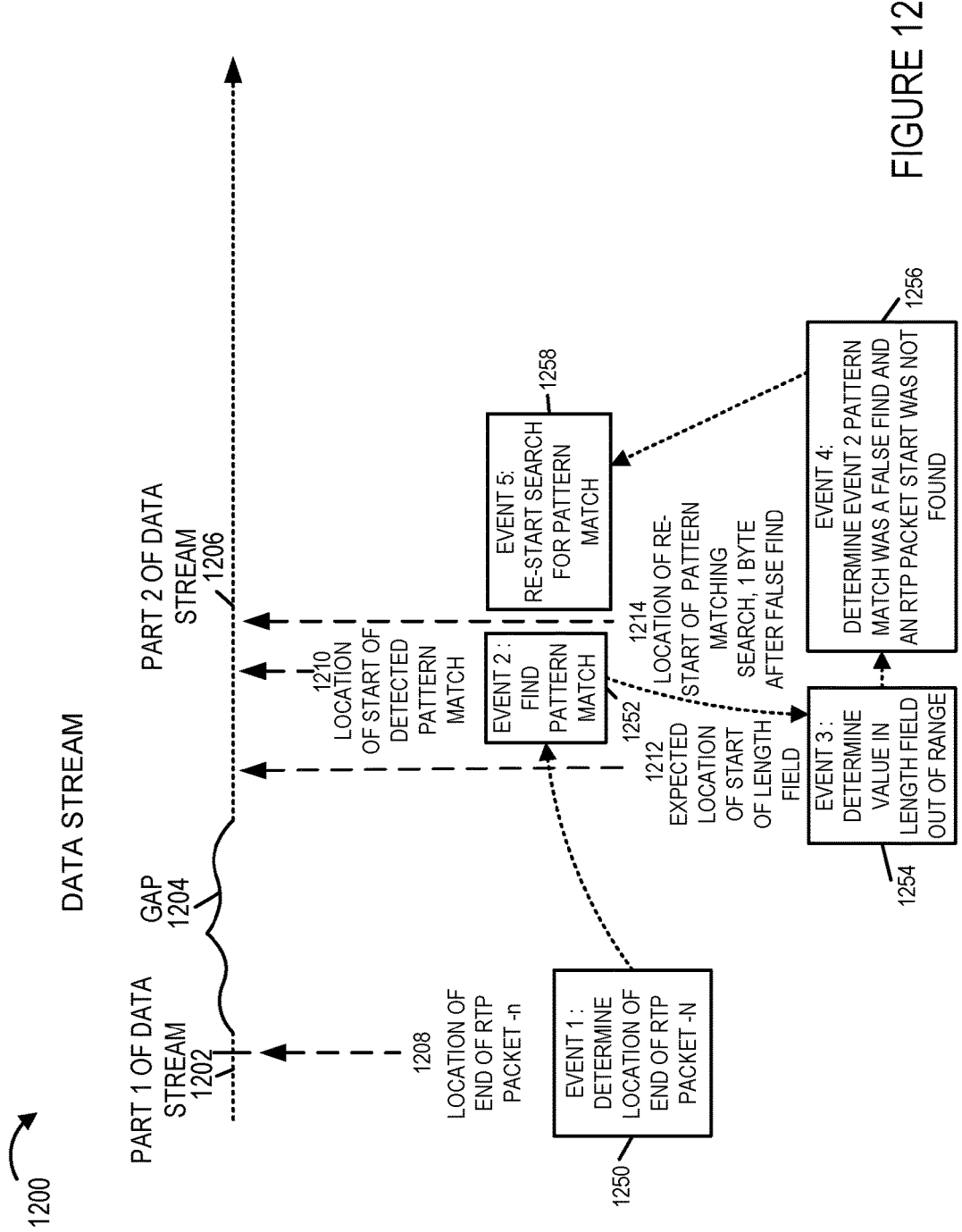
FIG. 12 illustrates and example in which a pattern match detection is identified as a false detection of a start of an RTP packet based on a failed reasonableness check of a value in a potential length field.

FIG. 12 illustrates and example in which a pattern match detection is identified as a false detection of a start of an RTP packet based on a failed reasonableness check of a value in a potential length field. Data stream 1200 includes a first portion 1202, followed by a gap 1204, followed by a second portion 1206. Location 1202 in data stream 1200 indicates the location of the end of RTP packet -n. Event 1 1250 corresponds to a determination of the end of RTP packet -n. Because the gap 1204 occurs, searching is subsequently performed looking for a pattern match after the gap. Event 2 1252 occurs, in which a pattern patch is detected, and the location of the pattern match starts at point 1210 in the data stream 1200. If the pattern match corresponds to detection of the start of an RTP packet, the length field should precede the start of the pattern match. The expected location of the start of the expected length field is location 1212 in the data stream 1200. In Event 3 1254, the value in the expected length field is checked and found to be outside the reasonable range. Therefore, in Event 4 1256, it is determined that the pattern match of event 2 1252 is determined to be a false find and an RTP packet was not found. Next, in event 5 1258, a new pattern match search procedure starts at location 1214, which is 1 byte after the start of false find 1210 in the data stream 1200.

To deal with cases, where there is a pattern match, corresponding to a false detection of the start of an RTP packet, and the Field Length is within the preconfigured range, in some embodiments, the following procedure is followed. If the start of a packet is found with pattern matching, the next packet should be verified with pattern matching of the respective bytes with the pattern built according to the pattern values of the latest packet, whose start was not found with pattern matching.

Figure 13:
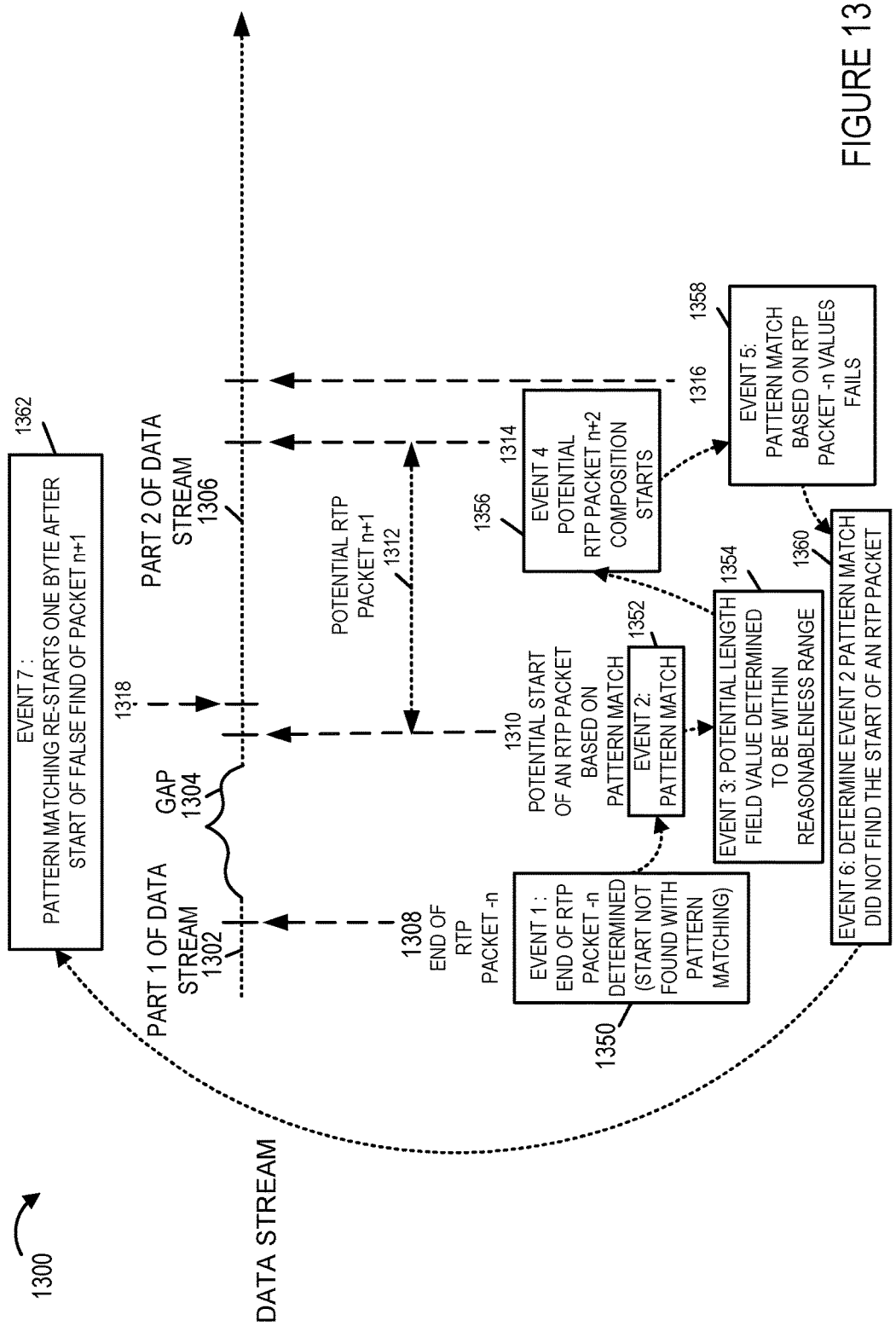
FIG. 13 illustrates and example in which there is a pattern match, and the value in the corresponding preceding potential field length field, is within the preconfigured range, but the pattern match is actually a false indication of a RTP packet start, and a second pattern match operation is used to detect the false indication.

FIG. 13 illustrates an example in which there is a pattern match, and the value in the corresponding preceding potential field length field, is within the preconfigured range, but the pattern match is actually a false indication of a RTP packet start, and a second pattern match operation is used to detect the false indication. Data stream 1300 includes a first portion 1302, followed by a gap 1304, followed by a second portion 1306. Point 1308 corresponds to the end of packet -n in the data stream. Event 1 1350 is the determination of the end of RTP packet -n. Note that RTP packet -n's start was not found with pattern matching. In response to gap 1304, pattern matching is performed to search for the start of an RTP packet. Following the gap 1304, at location 1310 in the data stream 1300, a pattern match is detected and designated as event 2 1352. Location 1310 is the potential start of an RTP packet based on pattern matching. In event 3, 1354, the check of the value, in the potential length field preceding the pattern match, determines that the length value is within the expected reasonable range. Potential packet n+1 1312, is identified in the data stream 1300 based on the value in the potential length field.

Location 1314 corresponds to the end of potential RTP packet n+1 1312 in data stream 1300. If event 2 actually corresponded to the detection of the start of RTP packet n+1, then it is expected that a length field for packet n+2 will start at location 1314 in data stream 1300, and will be followed by RTP packet n+2. Event 4 1356 indicates that the potential RTP packet n+2 composition starts. Event 5 1358 indicates that the pattern match for potential RTP packet n+2 fails, e.g., at location 1316 in the data stream 1300. In this example, information used in the pattern matching operation is based on RTP packet values from RTP packet -n, which was the last packet whose start was not found using packet matching. In event 6 1360, it is determined that the event 2 pattern match did not find the start of an RTP packet. Thus potential RTP packet n+1 1312 is not an RTP packet. In event 7 1362, pattern matching re-starts at position 1318, which is one byte after the false find of packet n+1.

Figure 14A:
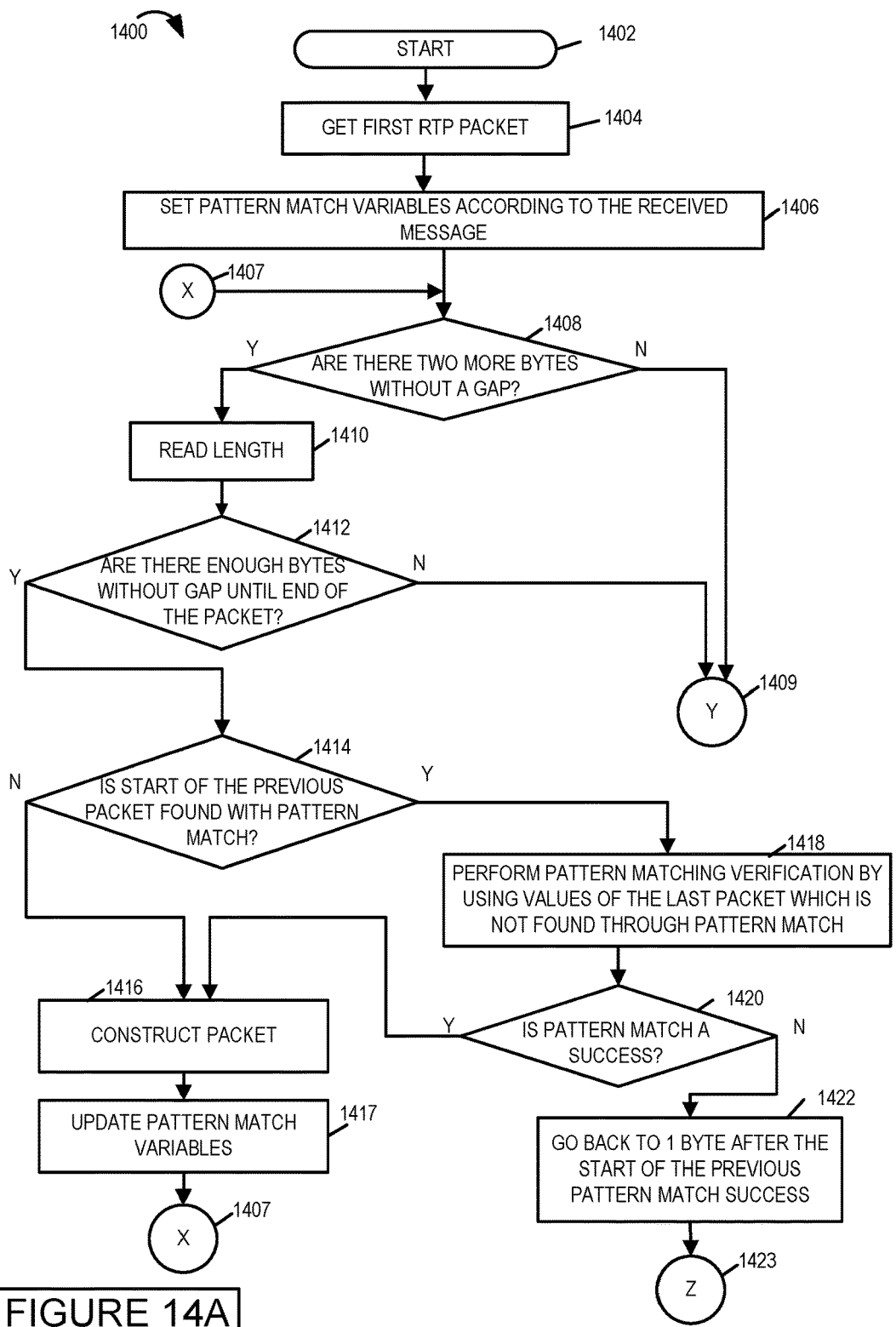
FIG. 14A is a first part of a flowchart of an exemplary method of communicating packets in accordance with an exemplary embodiment.
Figure 14B:
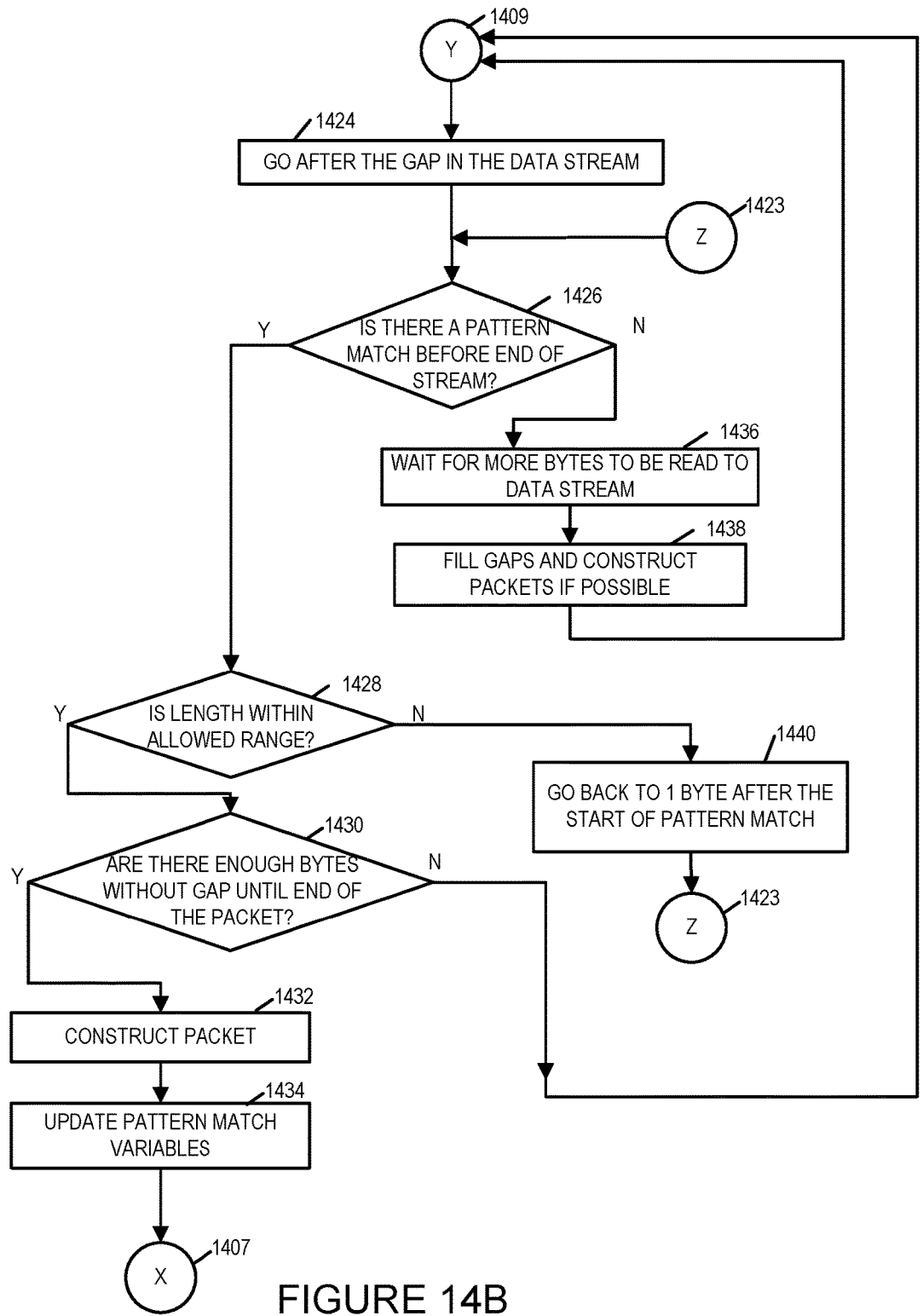
FIG. 14B is a second part of a flowchart of an exemplary method of communicating packets in accordance with an exemplary embodiment.

FIG. 14, comprising the combination of FIG. 14A and FIG. 14B, is a flowchart of an exemplary method of communicating packets in accordance with an exemplary embodiment. The method of flowchart 1400 may be implemented by a communications device, e.g., communications device 1008 of FIG. 1. The method of FIG. 14 relates to various structures, aspects, features, and/or steps described in FIGS. 6-13. Operation starts in step 1402, and proceeds to step 1404. In step 1404, a first RTP packet is obtained from the data stream being processed. The RTP packet is a message which includes various fields in its header. Operation proceeds from step 1404 to step 1406. In step 1406 pattern match variables are set according to the received message, e.g., the pattern match variable are set based on information included in the received message including, e.g., information based on the payload type field value, the sequence number, the timestamp field value, and the SSRC field value. Operation proceeds from step 1406 to step 1408.

In step 1408, it is determined if there are two more bytes without a gap in the data stream. It is expected that a length field corresponding to the next RTP packet will correspond to the next two bytes in the data stream being processed. If it is determined that there are two more bytes in the data stream without a gap, then operation proceeds from step 1408 to step 1410; otherwise, operation proceeds from step 1408, via connecting node Y 1409 to step 1424, Returning to step 1408, in step 1408 the length is read, e.g., the length field value for the next RTP packet is read from the two more bytes which correspond to the 16 bit length field. Operation proceeds from step 1410 to step 1412. In step 1412, a check is performed as to whether or not there are enough bytes without a gap in the data stream until the end of the packet, based on the length field value obtained in step 1410. If it is determined that there are enough bytes without a gap until the end of the packet, then operation proceeds from step 1412 to step 1414; otherwise, operation proceeds from step 1412, via connecting node Y 1409, to step 1424.

Returning to step 1414, in step 1414 it is determined whether or not the start of the previous packet was found with pattern match. If the start of the previous packet was found with pattern match, then operation proceeds from step 1414 to step 1418; otherwise, operation proceeds from step 1414 to step 1416.

In step 1416 a packet is constructed, e.g., using the bytes identified by the length field value of step 1410. Operation proceeds from step 1416 to step 1417. In step 1417 the pattern match variables are updated based on information in the header field of the constructed packet of step 1416. Operation proceeds from step 1417 via connecting node X 1407 to step 1408 for additional processing of the data stream.

Returning to step 1424, in step 1424, the processing position in the data stream moves to after the gap in the data stream, e.g., to a point corresponding to the end of the gap+2 bytes. The search for a pattern match starts to try to find the start of an RTP packet. The search window will slide, e.g., move forward, if a pattern match is not found to search the available data in the data stream. Operation proceeds from step 1424 to step 1426. In step 1426 a check is performed to determine if there is a pattern match before the end of the data stream. If a pattern match is not found before reaching the end of data stream, then operation proceeds from step 1426 to step 1436; otherwise, operation proceeds from step 1426 to step 1428 in response to a pattern match.

If operation proceeds to step 1436, the available data in the data stream to be processed has run out without finding a pattern match. Returning to step 1436, in step 1436 a wait is performed for more bytes to be read to the data stream. Operation proceeds from step 1436 to step 1438 in which gaps are filled and packets constructed if possible. Operation proceeds from step 1438, via connecting node Y 1409 to step 1424.

Returning to step 1428, in step 1428 a check is performed to determine if the length is within the allowed range. The allowed range is, e.g., a length field value reasonableness range, e.g., a predetermined reasonableness range. In various embodiments, different streams of RTP packets may correspond to different length field value reasonableness ranges. The location of the pattern match is used to identify a potential length field, e.g., a 16 bit length field which immediately precedes an RTP packet in the data stream. The length value being tested in step 1438 for reasonableness is the value obtained from the potential length field corresponding to the pattern match of step 1426. If the length is within the allowed range, e.g., the reasonableness test passes, then operation proceeds from step 1428 to step 1430; otherwise, operation proceeds from step 1428 to step 1440.

Returning to step 1430, in step 1430, a check is made as to whether or not there are enough bytes without a gap until the end of the packet. Thus step 1430 checks as to whether or not there are at least as many bytes without a gap as the number of bytes specified in length value of the potential length field. If it is determined that there are enough bytes without a gap, then operation proceeds from step 1430 to step 1432; otherwise, operation proceeds from step 1430 to step 1424, via connecting node Y 1409.

Returning to step 1440, in step 1440 a processing position in the data stream goes to 1 byte after the start of the pattern match. Operation has proceeded to step 1440 because the value in the length field has failed its reasonableness check in step 1428. Thus the prior match is deemed a false find, and the prior match did not find the start of an RTP packet. Operation proceeds from step 1440, via connecting node Z 1423, to step 1426, to search for the next pattern match in the data stream.

Returning to step 1432, in step 1432, a packet is constructed, e.g., the enough referred to in step 1430 are used to construct an RTP packet. Operation proceeds from step 1432 to step 1434 in which the pattern match variables are updated using information from the header field of newly constructed RTP packet from step 1432. Operation proceeds from step 1434, via connecting node X 1407 to step 1408.

Returning to step 1418, in step 1418, a pattern matching verification is performed by using values of the last packet which was not found through pattern match. Operation proceeds from step 1418 to step 1420. In step 1420, if the pattern match test of step 1418 is a success, then operation proceeds from step 1420 to step 1416. However, if the pattern match test of step 1418 is not a success, then operation proceeds from step 1420 to step 1422. In step 1422, the position in the data stream being processed is moved back to 1 byte after the start of the previous pattern match success, which was actually a false RTP packet start detection. Operation proceeds from step 1422 via connecting node Z 1423, to step 1426, in which the search continues for another pattern match using the advanced start point of step 1422.

Use of SCTP is an alternative as it is message oriented and provides unordered delivery and suffers less of HOLB due to possibility of using multiple streams.

SCTP is not allowed through some/most restrictive firewalls, only TCP is. The methods and apparatus described herein allow TCP to be used for communications without being subject to the Head of Line Blocking due to the passing of received packets without waiting for a missing packet to be received from the sender, e.g., in response to a TCP indication sent to the sender that a TCP packet was not successfully received.

The methods and apparatus described in the previous section may and sometimes are implemented in an entity, e.g., customer premise device such as a personal computer or TCP capable telephone or other device consuming, e.g., receiving and using, RTP over TCP. The methods and apparatus are well suited for deployment scenario where endpoints, e.g., user devices, are located behind firewall/NAT that block UDP packets and, e.g., allow only TCP based traffic. The described mechanism is also applicable for devices behind NAT and also core network elements interacting with such devices, e.g. SBC.

Figure 15:
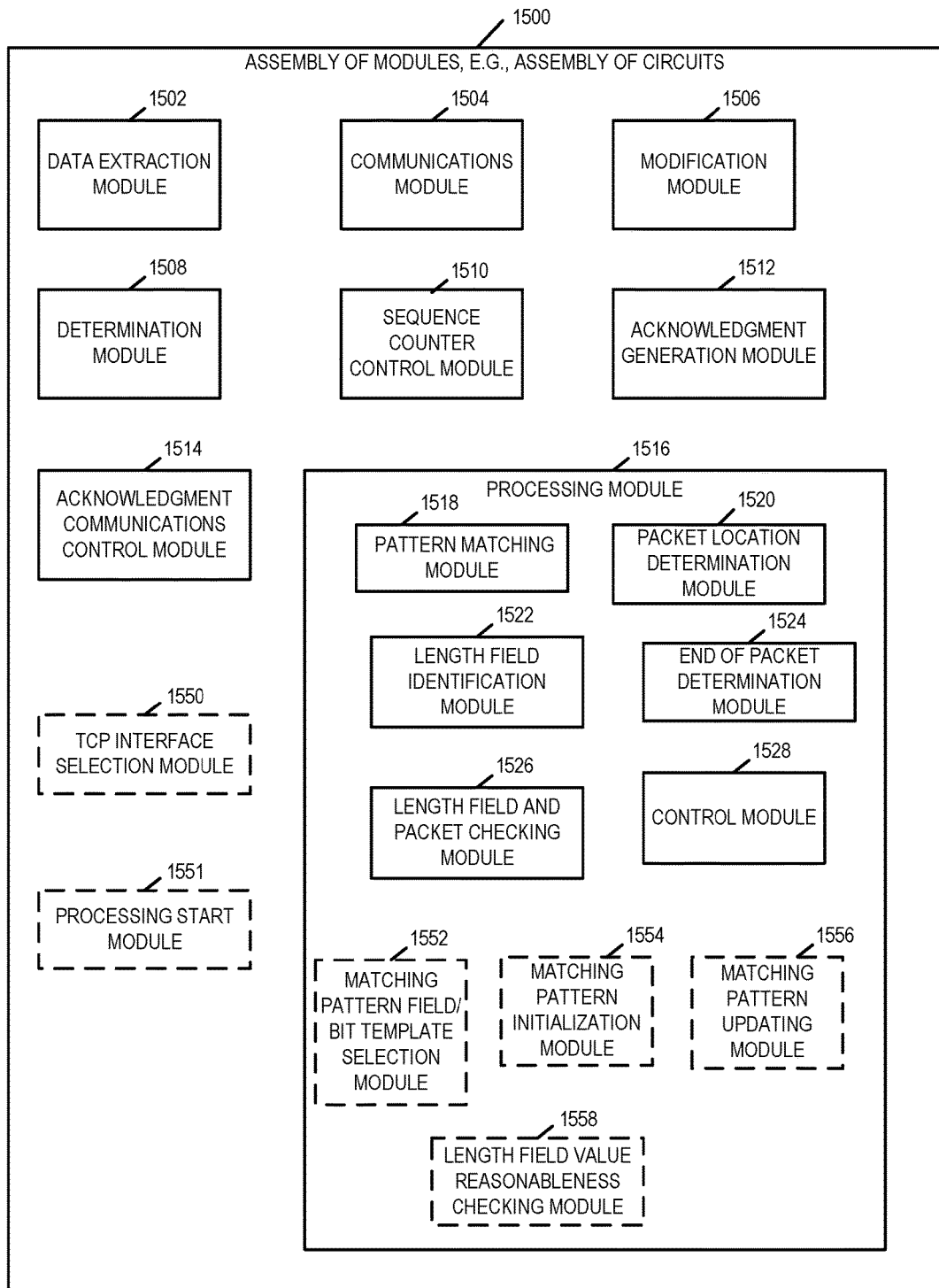
FIG. 15 is a drawing of an assembly of modules, which may be included in a communications device implemented in accordance with the present invention.

FIG. 15 is a drawing of an assembly of modules 1500, which may be included in a communications device implemented in accordance with the present invention, e.g., communications device 1008 of FIG. 1. Assembly of modules 1500 may implement steps of a method, e.g., steps of the method of flowchart 1600 of FIG. 16 and/or steps of the method of flowchart 1400 of FIG. 14. In some embodiments, assembly of modules 1500 is an assembly of circuits, which may be coupled together. In one exemplary embodiment, assembly of modules 1500 is assembly of modules 1020 of communications device 1008 of system 1000 of FIG. 1. In some embodiments, the assembly of module 1500 is an assembly of software modules. In one exemplary embodiment, assembly of modules 1500 is assembly of modules 1026 of memory 1018 of communications device 1008 of system 1000 of FIG. 1.

FIG. 15 illustrates an assembly of modules 1500 which can, and in some embodiments is, used in the communications device 1008 illustrated in FIG. 1. The modules in the assembly of modules 1500 can, and in some embodiments are, implemented fully in hardware within the processor 1016, e.g., as individual circuits. The modules in the assembly of modules 1500 can, and in some embodiments are, implemented fully in hardware within the assembly of modules 1020, e.g., as individual circuits corresponding to the different modules. In other embodiments some of the modules are implemented, e.g., as circuits, within the processor 1016 with other modules being implemented, e.g., as circuits within assembly of modules 1020, external to and coupled to the processor. As should be appreciated the level of integration of modules on the processor and/or with some modules being external to the processor may be one of design choice.

Alternatively, rather than being implemented as circuits, all or some of the modules in assembly of modules 1500 may be implemented in software and stored in the memory 1018 of the communications device 1008, with the modules controlling operation of communications device 1008 to implement the functions corresponding to the modules when the modules are executed by a processor, e.g., processor 1016. In some such embodiments, the assembly of modules 1500 is included in the memory 1018 as assembly of modules 1026. In still other embodiments, various modules in assembly of modules 1500 are implemented as a combination of hardware and software, e.g., with another circuit external to the processor providing input to the processor 1016 which then under software control operates to perform a portion of a module's function. While shown in the FIG. 1 embodiment as a single processor, e.g., computer, it should be appreciated that the processor 1016 may be implemented as one or more processors, e.g., computers.

When implemented in software the modules include code, which when executed by the processor 1016, configure the processor 1016 to implement the function corresponding to the module. In embodiments where the assembly of modules 1500 is stored in the memory 1018, the memory 1018 is a computer program product comprising a computer readable medium comprising code, e.g., individual code for each module, for causing at least one computer, e.g., processor 1016, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 15 control and/or configure the communications device 1008 or elements therein such as the processor 1016, to perform functions of the corresponding steps illustrated in the method flowchart 1600 of FIG. 16 and/or flowchart 1400 of FIG. 14. Thus the assembly of modules 1500 includes various modules that perform functions of the corresponding steps of the method shown in FIG. 16 and/or FIG. 14.

Assembly of modules 1500 includes a data extraction module 1502, a communications module 1504, a modification module 1506, a determination module 1508, a sequence counter control module 1510, an acknowledgement generation module 1512, an acknowledgment communications control module 1514, and a processing module 1516. Processing module 1516 includes a pattern matching module 1518, a packet location determination module 1520, a length field identification module 1522, and end of packet determination module 1524, a length field and packet checking module 1526, and a control module 1528.

Data extraction module 1502 is configured to extract data from a received TCP packet. Communications module 1504 is configured to provide said extracted data and a corresponding TCP packet sequence number to an RTP application irrespective of whether or not a preceding TCP packet in said packet sequence had been received. Modification module 1506 is configured to add said extracted data to said sequence of stored packet data at a location in said sequence of stored packet data determined based on the corresponding TCP packet sequence number associated with the extracted data. Determination module 1508 is configured to determine if said corresponding TCP packet sequence number is higher than the highest previously received TCP packet sequence number corresponding to said TCP packet sequence. Sequence counter control module 1510 is configured to increment a received TCP sequence counter to set a highest received sequence number of said TCP sequence counter to said corresponding TCP packet sequence number, when said determination module 1508 determines that that the received TCP sequence number is higher than the highest previously received sequence number corresponding to said TCP packet sequence. Acknowledgment generation module 1512 is configured to generate an acknowledgment indicating successful receipt of a TCP packet when said received TCP packet causes incrementing of said received TCP sequence counter. Acknowledgment communications control module 1514 is configured to send an acknowledgment indicating successful receipt of a TCP packet when said received packet causes incrementing of said received TCP sequence counter.

Data extraction module 1502 is further configured to extract second data from a second TCP packet. Communications module 1504 is further configured to provide said extracted second data and a corresponding second TCP packet sequence number to the RTP application irrespective of whether or not a preceding TCP packet in said packet sequence has been received. Modification module 1506 is further configured to add said extracted second data to the sequence of stored packet data at a location in said sequence of stored packet data determined based on a second TCP packet sequence number associated with the extracted second data. Determination module 1508 is further configured to determine if said corresponding second TCP packet sequence number is higher than the highest previously received TCP packet sequence number corresponding to said TCP packet sequence. Sequence counter control module 1510 is further configured to increment the received TCP sequence counter to set a highest received sequence number of said TCP sequence counter to said corresponding second TCP packet sequence number when said determination module 1508 determines that the corresponding second TCP packet sequence number is higher than the highest previously received sequence number corresponding to said TCP packet sequence. Sequence counter control module 1510 is further configured to refrain from changing the received TCP sequence counter to set a highest received sequence number of said TCP sequence counter when said determination module 1508 determines that the corresponding second TCP packet sequence number is lower than the highest previously received sequence number corresponding to said TCP packet sequence.

Acknowledgement communications control module 1514 is configured to refrain from sending an acknowledgment to the sender of the received TCP packet, when the determination module 1508 determines that the corresponding second TCP sequence number is lower than the highest previously received sequence number corresponding to said TCP packet sequence.

Processing module 1516 is configured to process data in said sequence of packet data to identify RTP packet boundaries. Pattern matching module 1518 is configured to perform a pattern matching operation to identify at least one RTP header field within said data. In some embodiments, pattern matching module 1518 is configured to check the data for expected pattern matching for at least two of the following RTP header fields: a version field, a payload type field, a sequence number field, a timestamp field, and an SSRC field. Packet location determination module 1520 is configured to determine a location of a RTP packet boundary based on the location of the identified header field in said data and a known offset from the location of the header field to the start of an RTP packet which includes the at least one identified RTP header field. Length field identification module 1522 is configured to identify a length field immediately preceding the start of an RTP packet header including the at least one identified RTP header field. End of packet determination module 1524 is configured to determine the end of the RTP packet including the identified at least one RTP header field based on the determined packet length. Length field and packet checking module 1526 is configured to check that another length field and another RTP packet immediately follow the determined end of the RTP packet. Control module 1528 is configured to use the pattern matching, e.g., use pattern module 1518, to find another RTP packet when said check, performed by module 1526, indicates that another field and another RTP packet do not immediately follow the determined end of the RTP packet.

In some embodiments, assembly of modules 1500 further includes one or more of: a TCP interface selection module 1550 and a processing start module 1551. TCP interface selection module 1550 is configured to select between alternative TCP interfaces based on whether or not the TCP stream to be processed includes RTP packets. For example, TCP interface selection module 1550 selects a second TCP interface, e.g., TCP interface 1017, which implements head of line blocking when the TCP packet stream does not communicate RTP packets, and selects a first TCP interface, e.g., TCP interface 1012, implemented in accordance with novel features of the invention, when the TCP packet stream includes RTP packets. Processing start module 1551 is configured to determine that the sequence of stored packet data includes sufficient data to begin processing, e.g., sufficient data to start identifying RTP packet boundaries and recover RTP packets.

In some embodiments, processing module 1516 includes one or more or all of: a matching pattern field/bit template selection module 1552, a matching pattern initialization module 1554, a matching pattern updating module 1556, and a length field value reasonableness checking module 1558.

In some embodiments, different RTP header field matching templates are used corresponding to different RTP data streams, different types of data being communicated, different communication rates, different latency requirements, different user service plans, different bandwidth allocations, different channel conditions, and/or different end user agreements. For example, in one template the first 8 bits of the sequence number are used for pattern matching and the other bits of the sequence number are don't care bits, and in another template the first 7 bits of the sequence number are used for pattern matching and other bits of the sequence number are don't care bits. In some different templates different sets of pattern matching fields are used. Matching patter field/bit template selection module 1552 is configured to select a particular template for pattern matching from a plurality of alternative templates, e.g., stored alternative templates for a particular RTP packet stream being communicated. Matching pattern initialization module 1554 is configured to populate the bits of the pattern matching template, which are not don't care bits, with initial values. Matching pattern updating module 1556 is configured to update the bits of the pattern matching template, which are not don't care bits with updated values, e.g., based on a detected RTP based from a successful pattern match following a gap. Length field value reasonableness checking module 1558 is configured to check the value in a potential length field preceding a possible detected start of an RTP packet based on pattern matching to determine whether or not the value is within a range of expected RTP packet length values. In some embodiments, different limits are used for the reasonableness check corresponding to different RTP packet streams.

In some embodiments, one or more or all of the modules (1518, 1520, 1522, 1524, 1526, 1528, 1552, 1554, 1556, 1558), which are shown to be included in processing module 1516, may be independent modules, e.g., located outside of module 1516.

Figures 16, 16A:
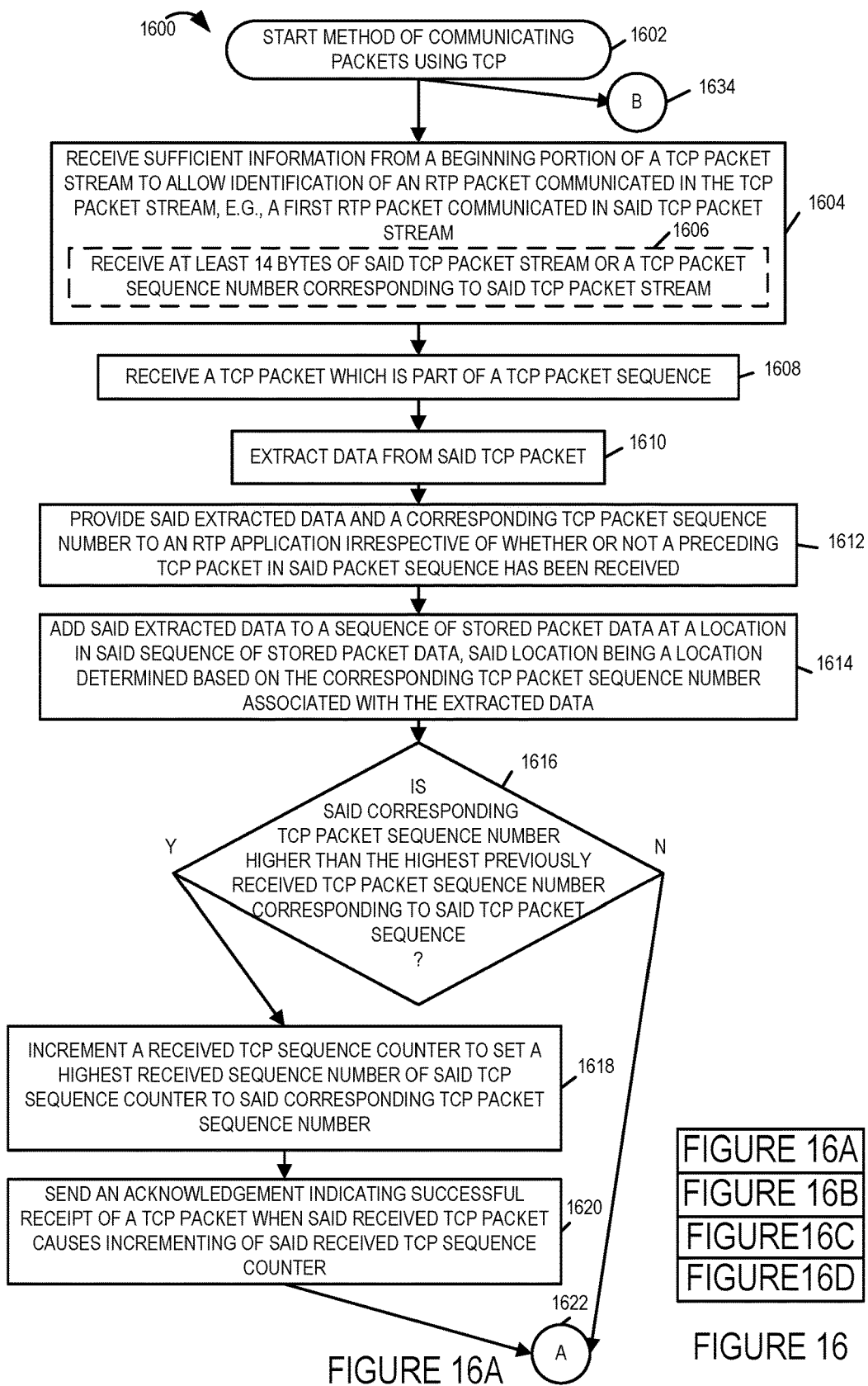
FIG. 16 illustrates the combination of FIGS. 16A, 16B, 16C and 16D.
FIG. 16A is a first part of a flowchart of an exemplary method of operating a communications device to communicate packets using TCP in accordance with an exemplary embodiment.
Figure 16B:
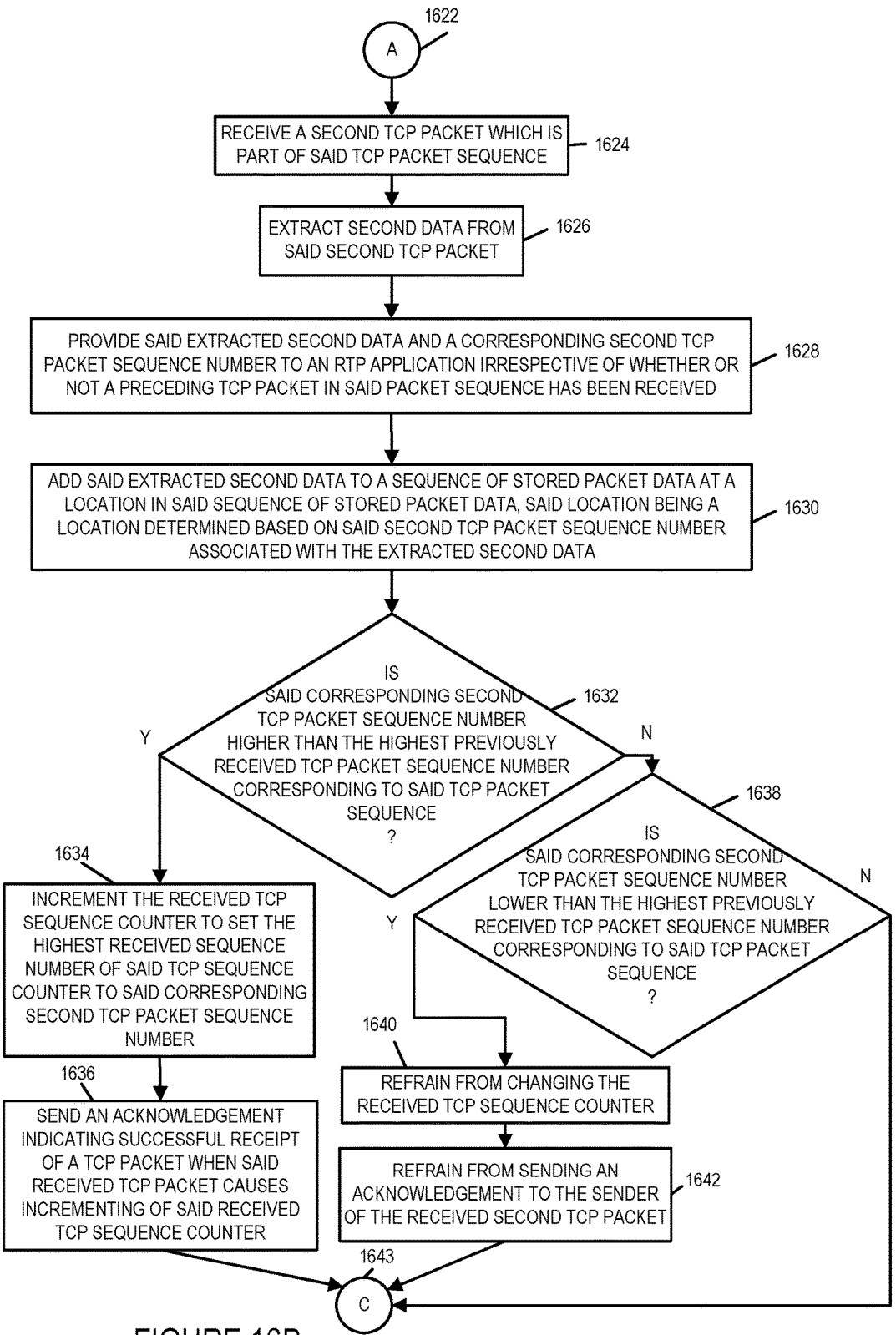
FIG. 16B is a second part of a flowchart of an exemplary method of operating a communications device to communicate packets using TCP in accordance with an exemplary embodiment.
Figure 16C:
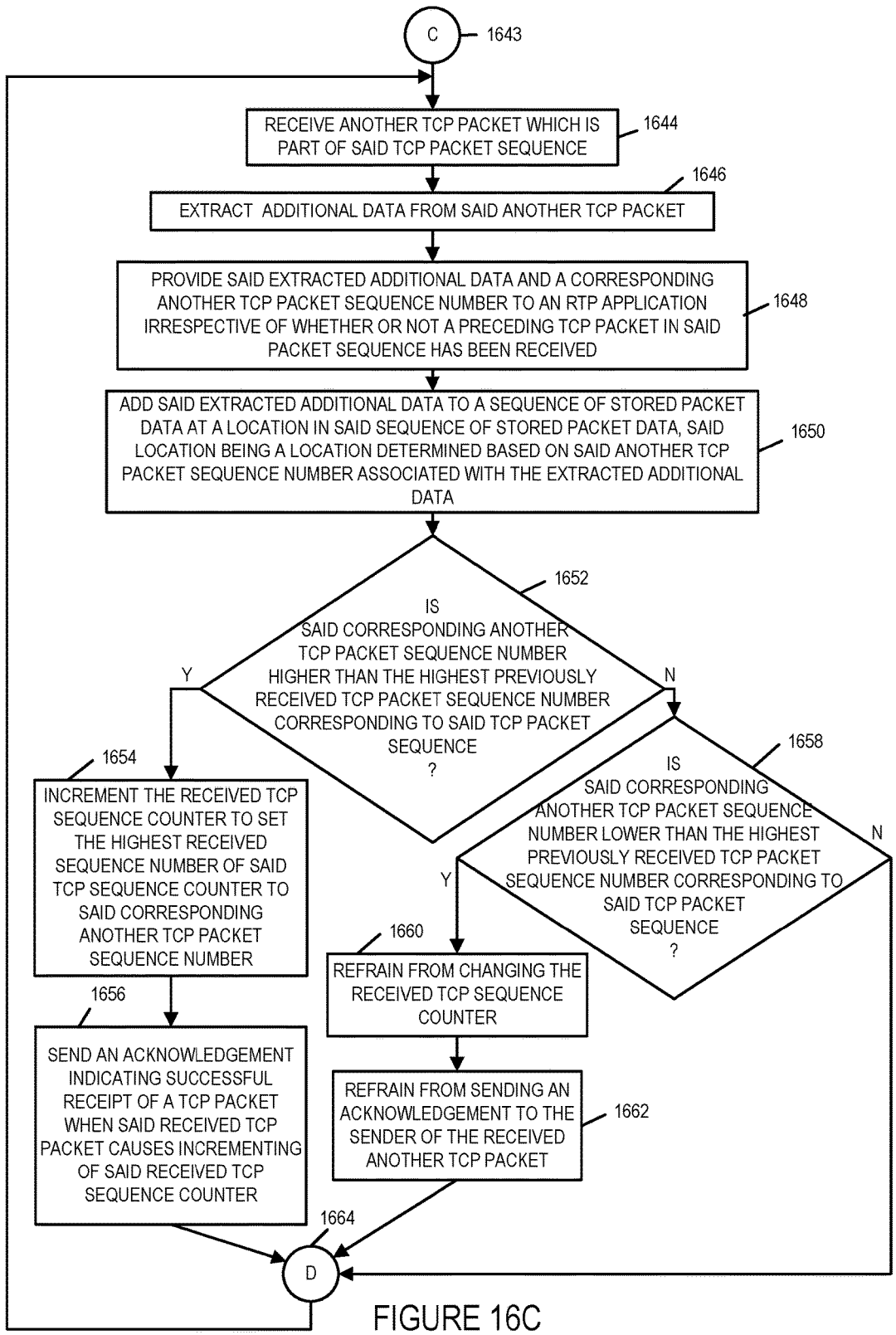
FIG. 16C is a third part of a flowchart of an exemplary method of operating a communications device to communicate packets using TCP in accordance with an exemplary embodiment.
Figure 16D:
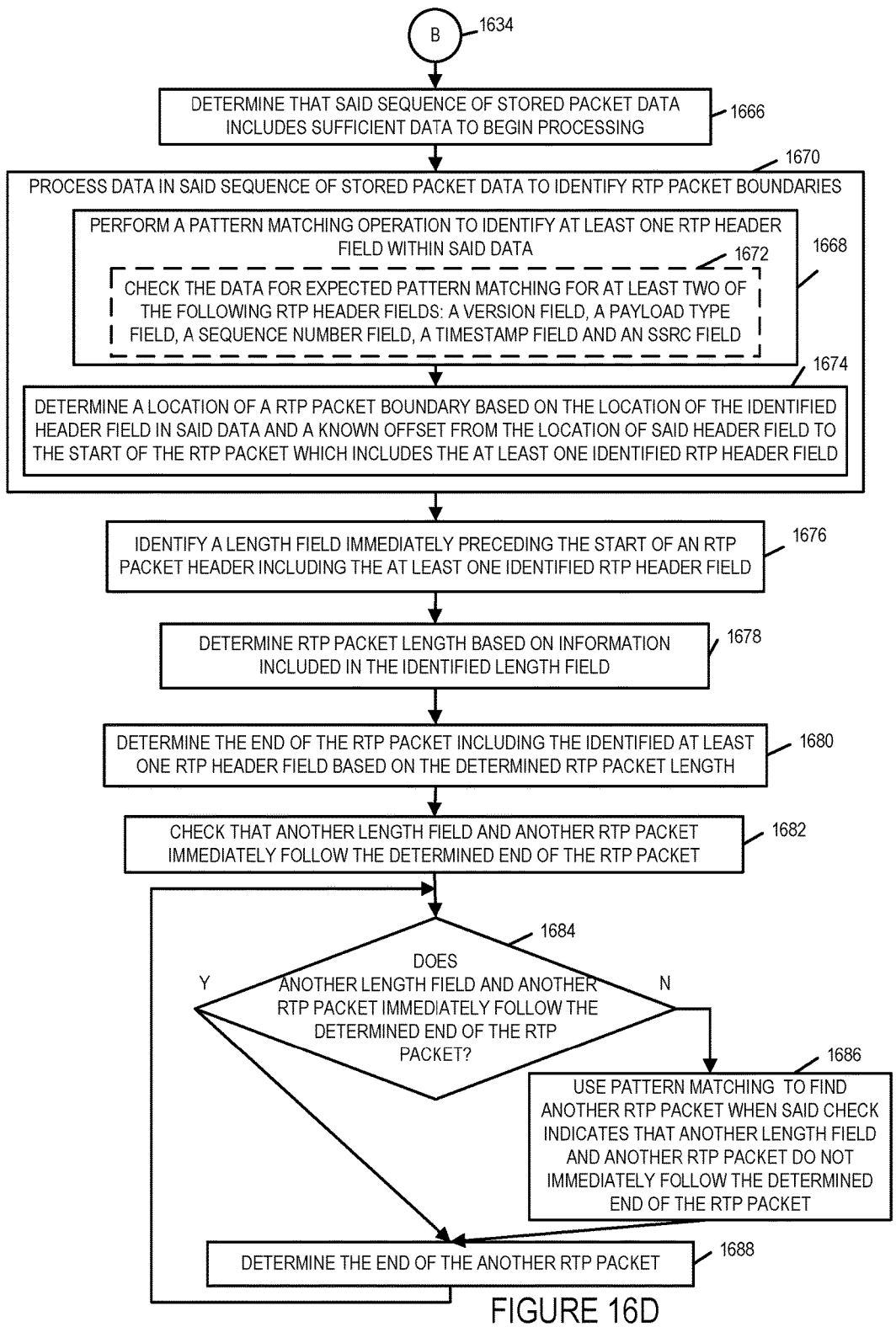
FIG. 16D is a fourth part of a flowchart of an exemplary method of operating a communications device to communicate packets using TCP in accordance with an exemplary embodiment.

FIG. 16, comprising the combination of FIG. 16A, FIG. 16B, FIG. 16C, and FIG. 16D is a flowchart 1600 of an exemplary method of operating a communications device to communicate packets using TCP in accordance with an exemplary embodiment. The communications device implementing the method of flowchart 1600 is, e.g., an end user device such as, e.g., a smart phone, a personal computer, a TCP capable telephone, etc., a core network element such as, e.g., a session border controller (SBC), or any other communications device including a TCP stack module. In one example, the communications device implementing the method of flowchart 1600 is communications device 1008, e.g., a user equipment device, of system 1000 of FIG. 1.

Operation of the exemplary method starts in step 1602, in which the communications device is powered on and initialized. Operation proceeds from step 1602 to step 1604. In addition, operation proceeds from step 1602, via connecting node B 1634, to step 1666. Returning to step 1604, in step 1604 the communications device receives sufficient information from a beginning portion of a TCP packet stream to allow identification of an RTP packet communicated in the TCP packet stream, e.g., a first RTP packet communicated in said TCP packet stream. In some embodiments, step 1604 includes step 1606, in which the communications device receives at least 14 bytes of said TCP packet stream or a TCP packet sequence number corresponding to said TCP packet stream. Operation proceeds from step 1604 to step 1608.

In step 1608 the communications device receives a TCP packet which is part of a TCP packet sequence. In some embodiments, step 1608 is included as part of step 1604. Operation proceeds from step 1608 to step 1610. In step 1610 the communications device extracts data from said TCP packet. Operation proceeds from step 1610 to step 1612.

In step 1612, the communications devices provides said extracted data and a corresponding TCP packet sequence number to an RTP application irrespective of whether or not a preceding packet in said packet sequence has been received. Operation proceeds from step 1612 to step 1614.

In step 1614, the communications device adds said extracted data to a sequence of stored packet data at a location in said sequence of stored packet data, said location being a location determined based on the corresponding TCP packet sequence number associated with the extracted data. Operation proceeds from step 1614 to step 1616.

In step 1616, the communications device determines if said corresponding TCP packet sequence number is higher than the highest previously received TCP packet sequence number. If the communications determines that the corresponding TCP packet sequence number is higher than the highest previously received TCP packet sequence number corresponding to the TCP packet sequence, then operation proceeds from step 1616 to step 1618; otherwise, operation proceeds from step 1616, via connecting node A 1622 to step 1624.

Returning to step 1618, in step 1618 the communications device increments a received TCP sequence counter to set a highest received sequence number of said TCP sequence counter to said corresponding TCP packet sequence number. Operation proceeds from step 1618 to step 1620, in which the communications device sends an acknowledgment indicating successful receipt to a TCP packet when said received TCP packet causes incrementing of said received TCP sequence counter. Operation proceeds from step 1620, via connecting node A 1622, to step 1624.

In step 1624 the communications device receives a second TCP packet which is part of said TCP packet sequence. Operation proceeds from step 1624 to step 1626. In step 1626 the communications device extracts second data from said TCP packet. Operation proceeds from step 1626 to step 1628. In step 1628 the communications device provides said extracted second data and a corresponding second TCP packet sequence number to an RTP application irrespective of whether or not a preceding TCP packet in said packet sequence has been received. Operation proceeds from step 1628 to step 1630.

In step 1630 the communications device adds said extracted second data to a sequence of stored packet data, said location being a location determined based on said second TCP packet sequence number associated with the extracted second data. Operation proceeds from step 1630 to step 1632. In step 1632 the communications device determines if said second TCP packet sequence number is higher than the highest previously received TCP packet sequence number corresponding to said TCP packet sequence. If it is determined that the second TCP packet sequence number is higher than the highest previously received TCP packet sequence number corresponding to said TCP packet sequence, then operation proceeds from step 1632 to step 1634; otherwise, operation proceeds from step 1632 to step 1638.

Returning to step 1634, in step 1634 the communications device increments the received TCP sequence counter to set the highest received sequence number of said TCP sequence counter to said corresponding second TCP packet sequence number. Operation proceeds from step 1634 to step 1636, in which the communications device sends an acknowledgment indicating successful receipt of a TCP packet when said received second TCP packet causes incrementing of said received TCP sequence counter. Operation proceeds from step 1636, via connecting node C 1643, to step 1644.

Returning to step 1638, in step 1638 the communication device determines if the corresponding second TCP packet sequence number is lower than the highest previously received TCP packet sequence number corresponding to the TCP packet sequence. If it is determined that the second TCP packet sequence number is lower than the highest previously received TCP packet sequence number corresponding to the TCP packet sequence, then operation proceeds from step 1638 to step 1640; otherwise, operation proceeds from step 1638, via connecting node C 1643 to step 1644. Returning to step 1640, in step 1640, the communications device refrains from changing the received TCP sequence counter. Operation proceeds from step 1640 to step 1642. In step 1642, the communications device refrains from sending an acknowledgment to the sender of the received second TCP packet. Operation proceeds from step 1642, via connecting node C 1643 to step 1644.

In step 1644 the communications device receives another TCP packet which is part of said TCP packet sequence. Operation proceeds from step 1644 to step 1646. In step 1646 the communications device extracts additional data from said another TCP packet. Operation proceeds from step 1646 to step 1648. In step 1648 the communications device provides said extracted additional data and a corresponding another TCP packet sequence number to an RTP application irrespective of whether or not a preceding TCP packet in said packet sequence has been received. Operation proceeds from step 1648 to step 1650.

In step 1650 the communications device adds said extracted additional data to a sequence of stored packet data at a location in said sequence of stored packet data, said location determined based on said another TCP packet sequence number associated with the extracted additional data. Operation proceeds from step 1650 to step 1652. In step 1652 the communications device determines if said another TCP packet sequence number is higher than the highest previously received TCP packet sequence number corresponding to said TCP packet sequence. If it is determined that the another TCP packet sequence number is higher than the highest previously received TCP packet sequence number corresponding to said TCP packet sequence, then operation proceeds from step 1652 to step 1654; otherwise, operation proceeds from step 1652 to step 1658.

Returning to step 1654, in step 1654 the communications device increments the received TCP sequence counter to set the highest received sequence number of said TCP sequence counter to said corresponding another TCP packet sequence number. Operation proceeds from step 1654 to step 1656, in which the communications device sends an acknowledgment indicating successful receipt of a TCP packet when said received another TCP packet causes incrementing of said received TCP sequence counter. This will prevent retransmissions since received packets with lower sequence numbers will be ignored for retransmission message generation purposes once the sent higher packet sequence number acknowledgement is received. Operation proceeds from step 1656, via connecting node D 1664, to step 1644.

Returning to step 1658, in step 1658 the communication device determines if the corresponding another TCP packet sequence number is lower than the highest previously received TCP packet sequence number corresponding to the TCP packet sequence. If it is determined that the corresponding TCP packet sequence number is lower than the highest previously received TCP packet sequence number corresponding to the TCP packet sequence, then operation proceeds from step 1658 to step 1660; otherwise, operation proceeds from step 1658, via connecting node D 1664 to step 1644. Returning to step 1660, in step 1660, the communications device refrains from changing the received TCP sequence counter. Operation proceeds from step 1660 to step 1662. In step 1662, the communications device refrains from sending an acknowledgment to the sender of the received another TCP packet. Operation proceeds from step 1662, via connecting node D 1664 to step 1644.

Returning to step 1666, in step 1666, the communications device determines that said sequence of stored packet data includes sufficient data to begin processing. Operation proceeds from step 1666 to step 1668. In step 1668 the communications device processes data in said sequence of packet data to identify RTP packet boundaries. Step 1668 includes step 1670 and step 1672. In step 1670 the communications device performs a packet matching operation to identify at least one RTP header field in said data. In some embodiments, step 1670 includes step 1672 in which the communications device checks the data for expected pattern matching for at least two of the following RTP header fields: a version field, a payload type field, a sequence number field, a timestamp field, and an SSRC field. Operation proceeds from step 1670 to step 1674, in which the communications device determines a location of a RTP packet boundary based on the location of the identified header field in said data and a known offset from the location of said header field to the start of the RTP packet which includes the at least one identified header field. Operation proceeds from step 1668 to step 1676.

In step 1676 the communications device identifies a length field immediately preceding the start of an RTP packet header including the at least one identified RTP header field. Operation proceeds from step 1676 to step 1678.

In step 1678 the communications device determines RTP packet length based on information included in the identified length field. Operation proceeds from step 1678 to step 1680. In step 1680 the communications device determines the end of the RTP packet including the identified at least one RTP header field based on the determined RTP packet length. Operation proceeds from step 1680 to step 1682. In step 1682 the communications device checks that another length field and another RTP packet immediately follow the determined end of the RTP packet. Operation proceeds from step 1682 to step 1684. In step 1684 the communications device controls operation as a function of the check as to whether or not another length field and another RTP packet immediately follow the determined packet. If the check indicates that another length field and another RTP packet does not immediately follow the determined end of the RTP packet, then operation proceeds from step 1684 to step 1686; otherwise, operation proceeds from step 1684 to step 1688. In step 1686 the communications device uses pattern matching to find another RTP packet when said check indicates that another length field and another RTP packet do not immediately follow the determined end of the RTP packet. Operation proceeds from step 1686 to step 1688, in which the communications device determines the end of the another RTP packet. Operation proceeds from step 1688 to step 1684 to continue processing the sequence of stored packet data.

In various embodiments, a reasonableness check is also performed on a value obtained from a field identified as a length field, based on pattern matching. Thus in some embodiments, a length field value reasonableness check is used to screen out a false indication of an RTP packet boundary identification based on a pattern match. Thus, in some embodiments, a pattern match may be identified as a false find based on a failed reasonableness check of length information.

In various embodiments, the data, e.g., test pattern to be applied, used for subsequent pattern matching is updated, when an RTP packet is found, e.g., when an RTP packet is found using pattern matching.

The methods and apparatus described herein can be used in wide variety of devices, which support RTP over TCP based streams. The methods and apparatus can be used to allow a party to support RTP over TCP based streams while avoiding or reducing the risk that the normal TCP packet holding mechanism which may result in head of line blocking will interfere with or degrade real time communications. The end devices implementing the methods described herein could be a mobile terminal, a softclient, a browser, a SBC, etc., each of which includes a processor and an interface for receiving/transmitting packets in a addition to a memory for storing received packets and/or received packet data as well as data and packets to be transmitted.

The methods and apparatus described herein can be used to support communication services, which use RTP and where the client is located behind a restrictive Firewall/NAT that block non-TCP packets but passes TCP packets. However, the methods and apparatus are not limited to applications where Firewalls and/or NATs perform such blocking and they can be used wherever RTP packets are communicated using TCP.

The techniques of various embodiments may be implemented using software, hardware and/or a combination of software and hardware. Various embodiments are directed to apparatus, e.g., communications device such as, e.g., user equipment devices, SBCs, etc. Various embodiments are also directed to methods, e.g., a communications method, etc. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal generation, signal transmission, signal reception, signal processing, storing information, retrieving information, making a determination, processing data, receiving TCP packets, extracting data from a received TCP packet, providing extracted data and a TCP packet sequence number to an RTP application, deciding whether or not to increment a received TCP sequence counter, generating an acknowledgment, sending an acknowledgment, processing data in a sequence of stored packet data to identify RTP packet boundaries, performing a pattern matching operation, and/or other steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to an apparatus, e.g., a communications device such as a user equipment device, SBC, etc., including a processor configured to implement one, multiple or all of the steps of one or more methods of the invention.

In some embodiments, the processor or processors, e.g., CPUs, of one or more devices, e.g., of the communications device, e.g., a user equipment device or an SBC, are configured to perform the steps of the methods described as being performed by the apparatus. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., such as communications device, e.g., a user equipment device or a SBC, with a processor which includes a module corresponding to each of the steps of the various described methods performed by the device in which the processor is included. In some but not all embodiments an apparatus, e.g., a communications device, e.g., a user equipment device or SBC, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a communications method. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of an apparatus for communicating packets using TCP (Transmission Control Protocol), the method comprising:
    detecting a gap in a first TCP packet sequence;
    switching from a first mode of processing TCP packets of the first TCP packet sequence to a second mode of processing TCP packets of the first TCP packet sequence when said gap is detected in the first TCP packet sequence;
    wherein said first mode of processing TCP packets implements TCP stack with head of line blocking (HOLB);
    wherein said second mode of processing TCP packets does not implement TCP stack with HOLB, said second mode of processing TCP packets includes:
    receiving a first TCP packet which is part of the first TCP packet sequence;
    extracting data from said first TCP packet;
    providing said extracted data and a corresponding TCP packet sequence number to an RTP (Real-Time Transport Protocol) application irrespective of whether or not a preceding TCP packet in said first TCP packet sequence has been received;
    determining if said corresponding TCP packet sequence number is higher than the highest previously received TCP packet sequence number corresponding to said first TCP packet sequence; and
    when it is determined that the received TCP packet sequence number is higher than the highest previously received packet sequence number corresponding to said first TCP packet sequence:
        incrementing a received TCP packet sequence counter to set a highest received packet sequence number of said TCP packet sequence counter to said corresponding TCP packet sequence number; and
    when it is determined that the received TCP sequence number is not higher than the highest previously received packet sequence number corresponding to said TCP packet sequence: receiving a second TCP packet which is part of the first TCP packet sequence without changing the received TCP packet sequence counter.

2. The method of claim 1 wherein said second mode of processing TCP packets further includes:
    adding said extracted data to a sequence of stored packet data at a location in said sequence of stored packet data, said location being a location determined based on the corresponding TCP packet sequence number associated with the extracted data.

3. The method of claim 1 wherein said second mode of processing TCP packets further includes:
    sending an acknowledgement indicating successful receipt of a TCP packet when said received first TCP packet causes incrementing of said received TCP packet sequence counter.

4. The method of claim 2 wherein said second mode of processing TCP packets further includes:
    extracting second data from said second TCP packet; and
    providing said extracted second data and a corresponding second TCP packet sequence number to the RTP application irrespective of whether or not a preceding TCP packet in said packet sequence has been received.

5. The method of claim 4 wherein said second mode of processing TCP packets further includes:
    adding said extracted second data to the sequence of stored packet data at a location in said sequence of stored packet data, said location being a location determined based on a second TCP packet number associated with the extracted second data.

6. The method of claim 5 wherein said second mode of processing TCP packets further includes:
    processing data in said sequence of packet data to identify RTP packet boundaries.

7. The method of claim 6, wherein said step of processing data in said sequence of packet data to identify RTP packet boundaries includes:
    performing a pattern matching operation to identify at least one RTP header field within said data; and
    determining a location of a RTP packet boundary based on the location of the identified header field in said data and a known offset from the location of said header field to the start of an RTP packet which includes the at least one identified RTP header field.

8. The method of claim 7, wherein performing a pattern matching operation includes checking the data for expected patterns matching at least two of the following RTP header fields: a version field, a payload type field, a sequence number field, a timestamp field, and an SSRC field.

9. The method of claim 7 wherein said second mode of processing TCP packets further includes:
    identifying a length field immediately preceding the start of an RTP packet header including the at least one identified RTP header field;
    determining RTP packet length based on information included in the identified length field; and
    determining the end of the RTP packet including the identified at least one RTP header field based on the determined RTP packet length.

10. An apparatus for communicating packets using TCP (Transmission Control Protocol), comprising:
    memory; and
    a processor configured to control said apparatus to:
        detect a gap in a first TCP packet sequence;
        switch from a first mode of processing TCP packets of the first TCP packet sequence to a second mode of processing TCP packets of the first TCP packet sequence when said gap is detected in the first TCP packet sequence;
    wherein said first mode of processing TCP packets implements TCP stack with head of line blocking (HOLB);

wherein said second mode of processing TCP packets does not implement TCP stack with HOLB, said second mode of processing TCP packets includes:
receiving a first TCP packet which is part of the first TCP packet sequence;
extracting data from said first TCP packet;
providing said extracted data and a corresponding TCP packet sequence number to an RTP (Real-Time Transport Protocol) application irrespective of whether or not a preceding TCP packet in said first TCP packet sequence has been received; and
determining if said corresponding TCP packet sequence number is higher than the highest previously received TCP packet sequence number corresponding to said first TCP packet sequence; and
when it is determined that the received TCP packet sequence number is higher than the highest previously received packet sequence number corresponding to said first TCP packet sequence:
incrementing a received TCP packet sequence counter to set a highest received packet sequence number of said TCP packet sequence counter to said corresponding TCP packet sequence number; and
when it is determined that the received TCP sequence number is not higher than the highest previously received packet sequence number corresponding to said TCP packet sequence: receiving a second TCP packet which is part of the first TCP packet sequence without changing the received TCP packet sequence counter.

11. An apparatus for communicating packets using TCP (Transmission Control Protocol), comprising:
a processor configured to control the apparatus to:
detect a gap in a first TCP packet sequence, and
switch from a first mode of processing TCP packets of the first TCP packet sequence to a second mode of processing TCP packets of the first TCP packet sequence when said gap is detected in the first TCP packet sequence, said first mode of processing TCP packets implementing TCP stack with head of line blocking (HOLB), said second mode of processing TCP packets not implementing TCP stack with HOLB;
an interface including a receiver configured to receive a TCP packet which is part of the TCP packet sequence;
a data extraction module configured to extract data from said TCP packet;
a communications module configured to provide said extracted data and a corresponding TCP packet sequence number to an RTP (Real-Time Transport Protocol) application irrespective of whether or not a preceding TCP packet in said packet sequence has been received when said apparatus is operating in said second mode of processing TCP packets;
a determination module configured to determine if said corresponding TCP packet sequence number is higher than the highest previously received TCP packet sequence number corresponding to said first TCP packet sequence; and
a sequence counter control module configured to increment a received TCP sequence counter to set a highest received packet sequence number of said TCP sequence counter to said corresponding TCP packet sequence number, when said determination module determines that the received TCP packet sequence number is higher than the highest previously received packet sequence number corresponding to said TCP packet sequence and said apparatus is being operated in said second mode of processing TCP packets.

12. The apparatus of claim 11, further comprising:
an acknowledgement communications control module configured to send an acknowledgement indicating successful receipt of a TCP packet when said received TCP packet causes incrementing of said received TCP sequence counter and said apparatus is being operated in said second mode of processing TCP packets.

13. The apparatus of claim 11, further comprising:
a processing module configured to process data in said sequence of packet data to identify RTP packet boundaries when said apparatus is being operated in said second mode of processing TCP packets.

14. The apparatus of claim 13, wherein said processing module is further configured, as part of being configured to process data in said sequence of packet data to identify RTP packet boundaries, to perform the following:
perform a pattern matching operation to identify at least one RTP header field within said data; and
determine a location of a RTP packet boundary based on the location of the identified header field in said data and a known offset from the location of said header field to the start of an RTP packet which includes the at least one identified RTP header field.

15. The wed apparatus of claim 10 wherein said processor if further configured to send an acknowledgement indicating successful receipt of a TCP packet when said received first TCP packet causes incrementing of said received TCP sequence counter and said apparatus is being operated in said second mode of processing TCP packets.

16. The method of claim 1 further comprising:
prior to starting processing of TCP packets of the first TCP packet sequence determining whether or not the TCP packets of the first TCP packet sequence include RTP packets, and
when the first TCP packet sequence is determined to include RTP packets using the second mode of processing TCP packets when a gap is detected in the first TCP packet sequence.

17. The method of claim 16 further comprising:
prior to starting processing of TCP packets of a second TCP packet sequence determining whether or not TCP packets of the second TCP packet sequence include RTP packets; and
when the second TCP packet sequence is determined not to include RTP packets using the first mode of processing TCP packets when a gap is detected in the second TCP packet sequence;
detecting a gap in the second TCP packet sequence;
subsequent to detecting a gap in the second TCP packet sequence using the first mode of processing TCP packets to process received TCP packets of the second TCP packet sequence.

18. The method of claim 6, wherein said step of processing data in said sequence of packet data to identify RTP packet boundaries includes:
performing a pattern matching operation to identify at least one potential RTP header field within said data;
identifying a potential length field for an RTP packet for which the at least one potential RTP header field within said data was identified based on the position of the potential RTP header field within said data;
determining a potential length value of the RTP packet for which the potential length field was identified; and performing at least one reasonableness test on the determined potential length value of the RTP packet, said at least one reasonableness test including determining that the determined length value is within an expected reasonableness range.

19. The apparatus of claim 14, wherein performing a pattern matching operation includes checking the data for expected patterns matching at least two of the following RTP header fields: a version field, a payload type field, a sequence number field, a timestamp field, and an SSRC field.

20. The apparatus of claim 13, wherein said processing module is further configured, as part of being configured to process data in said sequence of packet data to identify RTP packet boundaries, to perform the following:

perform a pattern matching operation to identify at least one potential RTP header field within said data;

identify a potential length field for an RTP packet for which the at least one potential RTP header field within said data was identified based on the position of the potential RTP header field within said data;

determine a potential length value of the RTP packet for which the potential length field was identified; and perform at least one reasonableness test on the determined potential length value of the RTP packet, said at least one reasonableness test including determining that the determined length value is within an expected reasonableness range.

* * * * *